US012681964B2

(12) United States Patent
Mudgal et al.

(10) Patent No.: US 12,681,964 B2
(45) Date of Patent: Jul. 14, 2026

(54) BLOCKWISE CONTROLLED DECODING OF NATURAL LANGUAGE (NL) BASED OUTPUT GENERATED USING A LARGE LANGUAGE MODEL (LLM) TO REDUCE LATENCY IN RENDERING THEREOF

(71) Applicant: GOOGLE LLC, Mountain View, CA (US)

(72) Inventors: Sidharth Mudgal, Mountain View, CA (US); Ahmad Beirami, New York, NY (US); Jilin Chen, Cupertino, CA (US); Alex Beutel, Brooklyn, NY (US); Harish Ganapathy, Sunnyvale, CA (US); YaGuang Li, Sunnyvale, CA (US); Tao Wang, Sunnyvale, CA (US); Yanping Huang, Mountain View, CA (US); Trevor Strohman, Sunnyvale, CA (US)

(73) Assignee: GOOGLE LLC, Mountain View, CA (US)

( * ) Notice: Subject to any disclaimer, the term of this patent is extended or adjusted under 35 U.S.C. 154(b) by 156 days.

(21) Appl. No.: 18/225,990

(22) Filed: Jul. 25, 2023

(65) Prior Publication Data

US 2024/0330334 A1 Oct. 3, 2024

Related U.S. Application Data

(60) Provisional application No. 63/456,781, filed on Apr. 3, 2023.

(51) Int. Cl.
*G06F 40/279* (2020.01)
*G06F 16/3329* (2025.01)
(Continued)

(52) U.S. Cl.
CPC ........ *G06F 16/3329* (2019.01); *G06F 40/284* (2020.01)

(58) Field of Classification Search
CPC .... G06F 40/279; G06F 40/284; G06F 40/289; G06F 40/30; G06F 40/35; G06F 16/33295
(Continued)

(56) References Cited

U.S. PATENT DOCUMENTS 11,194,973 B1 * 12/2021 Goel ........................ G06F 40/35
11,501,088 B1 * 11/2022 Mariko .................... G06F 40/35
(Continued)

FOREIGN PATENT DOCUMENTS

WO 2023038654 A1 3/2023

OTHER PUBLICATIONS

Alammar, J. "The Illustrated GPT-2 (Visualizing Transformer Language Models)—Visualizing machine learning one concept at a time"; retrieved from the Internet: URL:https://web.archive.org/web/20230209061705/http://jalammar.github.io/illustrated-gpt2/; 34 pages; dated Feb. 9, 2023.
(Continued)

*Primary Examiner* — Martin Lerner
(74) *Attorney, Agent, or Firm* — Gray Ice Higdon

(57) ABSTRACT

Implementations relate to reducing latency in generating and/or rendering a given stream of natural language (NL) based output generated using a large language model (LLM). Processor(s) of a system can: receive NL based input associated with a client device, generate the stream of NL based output utilizing the LLM that is responsive to the NL based input and that is for a given dialog context of an ongoing dialog, and cause the stream of NL based output to be rendered at the client device. Notably, the processor(s) can employ attribute classifier(s) and a multi-objective
(Continued)

scorer to implement a blockwise controlled decoding technique in generating the stream of NL based output utilizing the LLM. By implementing the blockwise controlled decoding technique in generating the stream of NL based output utilizing the LLM, the processor(s) can reduce latency in generating and/or of the stream of NL based output generated utilizing the LLM.

18 Claims, 7 Drawing Sheets

(51) Int. Cl.
*G06F 40/284* (2020.01)
*G06F 40/35* (2020.01)

(58) Field of Classification Search
USPC .......................... 704/1, 9, 257; 707/723, 748
See application file for complete search history.

(56) References Cited

U.S. PATENT DOCUMENTS 12,086,713 B2 * 9/2024 De Freitas Adiwardana .............. G06N 3/08
12,148,421 B2 * 11/2024 Baeuml ................... G10L 15/22
2014/0156260 A1 * 6/2014 Zweig ................... G06F 40/237 704/9
2015/0261745 A1 * 9/2015 Song ....................... G06F 40/56 704/9
2018/0121415 A1 * 5/2018 Perez ...................... G06F 40/35
2021/0200961 A1 * 7/2021 Shao ..................... G06F 40/284
2021/0359961 A1 * 11/2021 Matula .................... G06F 40/35
2023/0244678 A1 * 8/2023 Hill ........................ G06N 20/00 707/748
2023/0306049 A1 * 9/2023 Shah ................... G06F 16/3329
2023/0343324 A1 * 10/2023 Baeuml ................... G10L 15/22
2023/0376697 A1 * 11/2023 Chow ..................... G06F 40/35
2024/0126501 A1 * 4/2024 Otto ...................... G06F 40/205
2024/0184991 A1 * 6/2024 Mahabaleshwarkar ...................... G06F 40/35
2024/0256235 A1 * 8/2024 Potti ....................... G06F 8/427
2024/0311402 A1 * 9/2024 Baeuml ................... G06F 40/35

OTHER PUBLICATIONS

European Patent Office; International Search Report and Written Opinion issued in Application No. PCT/US2023/034816; 11 pages; dated Feb. 8, 2024.

* cited by examiner

500

OBTAIN A PLURALITY OF TRAINING INSTANCES FOR TRAINING A MULTI-OBJECTIVE SCORER, EACH OF THE PLURALITY OF TRAINING INSTANCES INCLUDING A CORRESPONDING DIALOG CONTEXT AND A CORRESPONDING NL BASED OUTPUT THAT IS ASSOCIATED WITH THE CORRESPONDING DIALOG CONTEXT 552

PROCESS A GIVEN TRAINING INSTANCE FROM AMONG THE PLURALITY OF TRAINING INSTANCES 554

PROCESS, USING A PLURALITY OF ATTRIBUTE CLASSIFIERS, THE CORRESPONDING DIALOG CONTEXT AND THE CORRESPONDING NL BASED OUTPUT, IN ITS ENTIRETY, THAT IS ASSOCIATED WITH THE CORRESPONDING DIALOG CONTEXT TO GENERATE A GIVEN SET OF A PLURALITY OF ATTRIBUTE SCORES FOR THE GIVEN TRAINING INSTANCE 554A

PROCESS, USING THE MULTI-OBJECTIVE SCORER, THE CORRESPONDING DIALOG CONTEXT AND THE CORRESPONDING NL BASED OUTPUT, ON A TOKEN-BY-TOKEN BASIS, THAT IS ASSOCIATED WITH THE CORRESPONDING DIALOG CONTEXT TO GENERATE A GIVEN CORRESPONDING SET OF A PLURALITY OF PREDICTED ATTRIBUTE SCORES FOR EACH TOKEN OF THE CORRESPONDING NL BASED OUTPUT 554B

DETERMINE, BASED ON (1) THE GIVEN SET OF THE PLURALITY OF ATTRIBUTE SCORES FOR THE GIVEN TRAINING INSTANCE AND (2) THE GIVEN CORRESPONDING SET OF THE PLURALITY OF PREDICTED ATTRIBUTE SCORES FOR EACH TOKEN OF THE CORRESPONDING NL BASED OUTPUT, A GIVEN MULTI-OBJECTIVE SCORER LOSS 556

CAUSE, BASED ON THE GIVEN MULTI-OBJECTIVE SCORER LOSS, THE MULTI-OBJECTIVE SCORER TO BE UPDATED 558

ADDITIONAL TRAINING INSTANCE? 560

YES

NO

CAUSE THE MULTI-OBJECTIVE SCORER TO BE UTILIZED IN BLOCKWISE DECODING OF NL BASED OUTPUT GENERATED USING A LLM 562

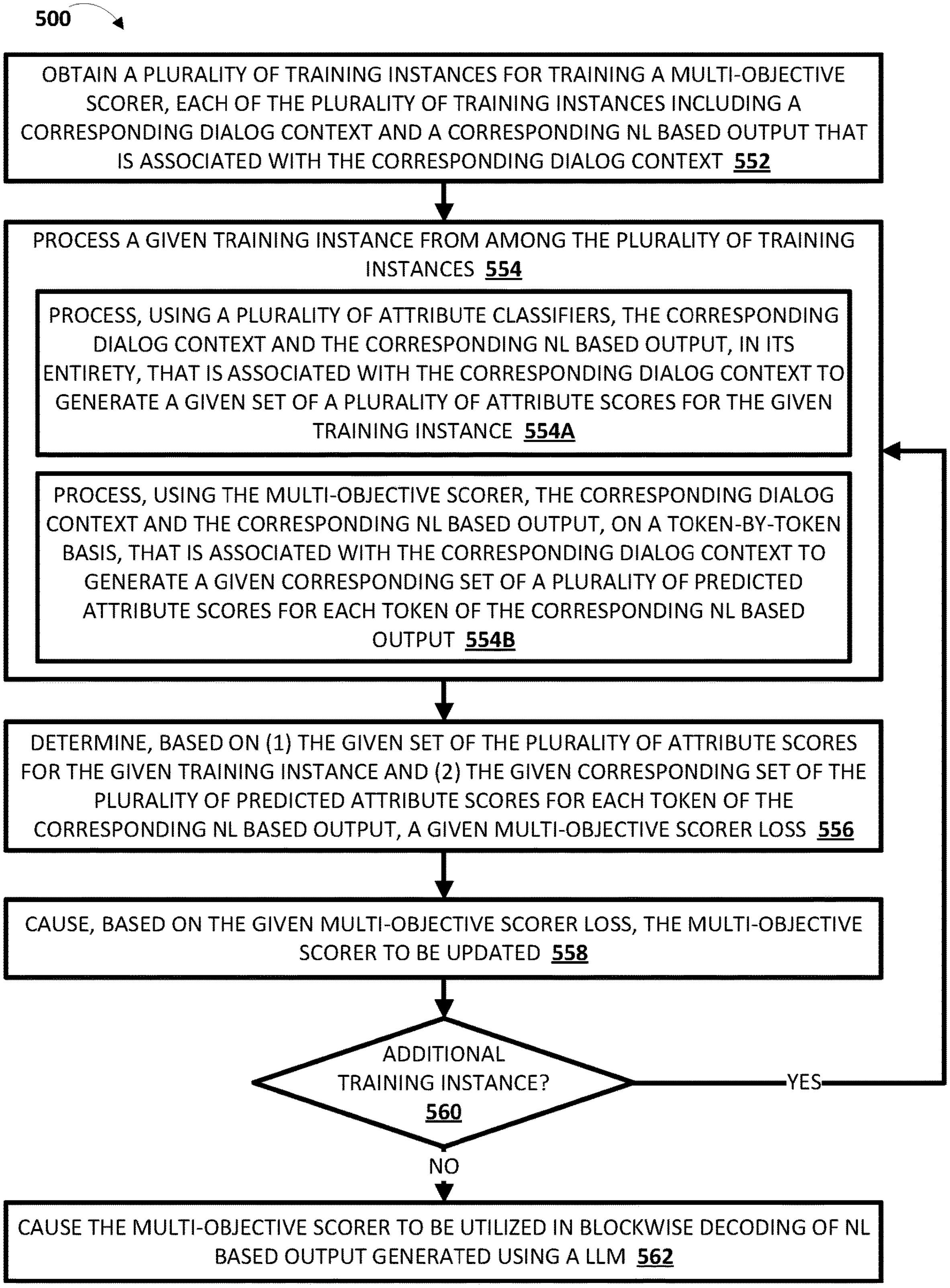

RECEIVE NL BASED INPUT ASSOCIATED WITH A CLIENT DEVICE 652

PROCESS, USING A LLM, THE NL BASED INPUT TO GENERATE A STREAM OF LLM OUTPUT 654

DETERMINE, BASED ON THE STREAM OF LLM OUTPUT, A PLURALITY OF CANDIDATE SEGMENTS FOR A GIVEN SEGMENT OF A GIVEN STREAM OF NL BASED OUTPUT THAT IS RESPONSIVE TO THE NL BASED INPUT AND THAT IS FOR A GIVEN DIALOG CONTEXT OF AN ONGOING DIALOG 656

PROCESS, USING PLURALITY OF ATTRIBUTE CLASSIFIERS, EACH OF THE PLURALITY OF CANDIDATE SEGMENTS, FOR THE GIVEN SEGMENT, TO GENERATE A CORRESPONDING SET OF A PLURALITY OF ATTRIBUTE SCORES FOR EACH OF THE PLURALITY OF CANDIDATE SEGMENTS 658

PROCESS, USING A MULTI-OBJECTIVE SCORER, THE CORRESPONDING SETS OF THE PLURALITY OF ATTRIBUTE SCORES, FOR EACH OF THE PLURALITY OF CANDIDATE SEGMENTS, TO SELECT THE GIVEN SEGMENT, FROM AMONG THE PLURALITY OF CANDIDATE SEGMENTS, FOR INCLUSION IN THE GIVEN STREAM OF NL BASED OUTPUT THAT IS RESPONSIVE TO THE NL BASED INPUT AND THAT IS FOR THE GIVEN DIALOG CONTEXT OF THE ONGOING DIALOG 660

ALTERNATVE DIALOG CONTEXT? 662 ——YES

NO

ADDITIONAL SEGMENT? 664 ——YES

NO

CAUSE THE GIVEN STREAM(S) OF NL BASED OUTPUT TO BE RENDERED AT THE CLIENT DEVICE 666

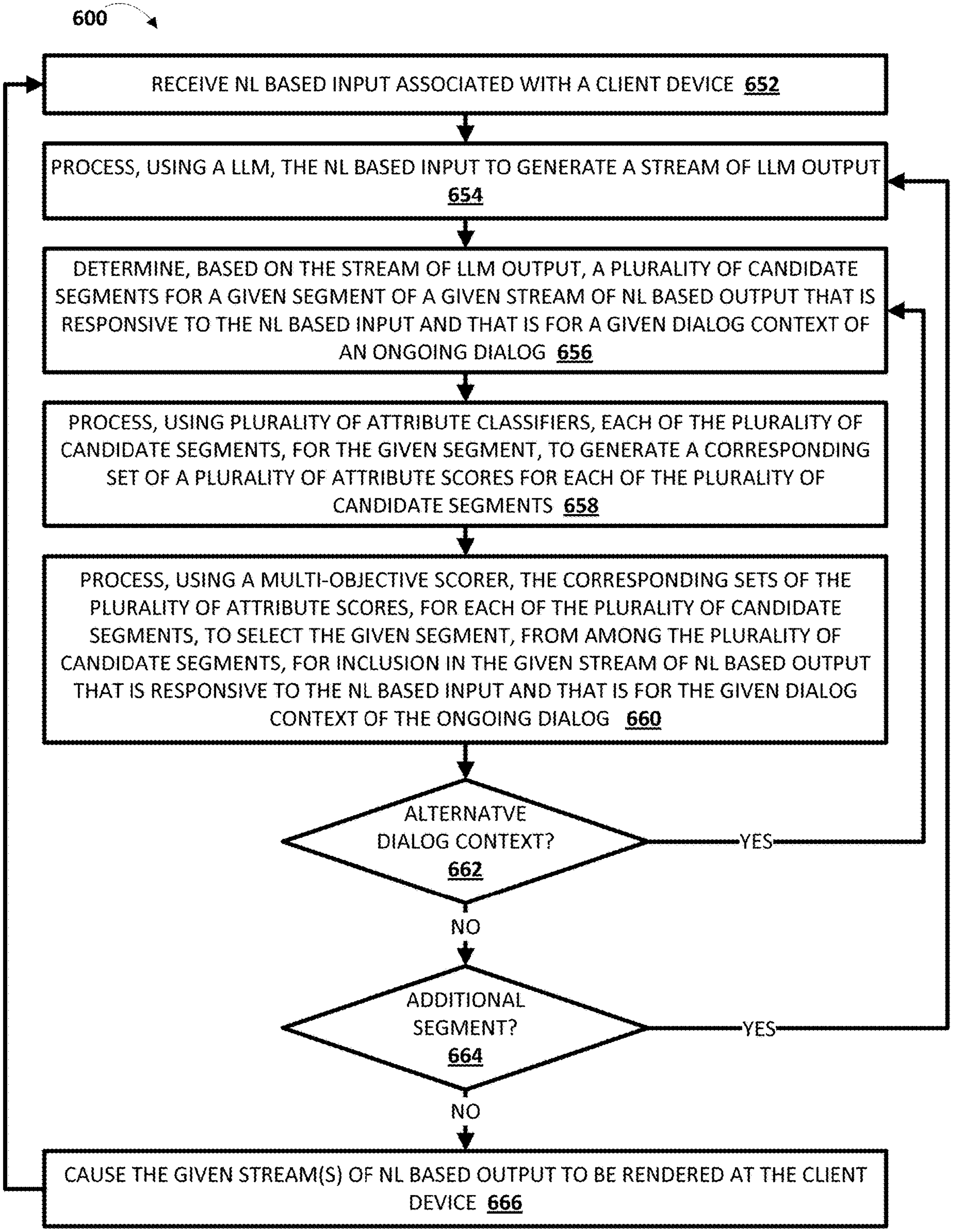

FIG. 6

BLOCKWISE CONTROLLED DECODING OF NATURAL LANGUAGE (NL) BASED OUTPUT GENERATED USING A LARGE LANGUAGE MODEL (LLM) TO REDUCE LATENCY IN RENDERING THEREOF

BACKGROUND

Large language models (LLMs) are particular types of machine learning models that can perform various natural language processing (NLP) tasks, such as language generation, machine translation, and question-answering. These LLMs are typically trained on enormous amounts of diverse data including data from, but not limited to, webpages, electronic books, software code, electronic news articles, and machine translation data. Accordingly, these LLMs leverage the underlying data on which they were trained in performing these various NLP tasks. For instance, in performing a language generation task, these LLMs can process a natural language (NL) based input that is received from a client device, and generate a NL based output that is responsive to the NL based input and that is to be rendered at the client device. However, in generating the NL based output utilizing these LLMs, additional latency is introduced that may not be present absent utilizing these LLMs. This additional latency can prolong user interactions with these LLMs and detract from a user experience with these LLMs. Accordingly, there is a need in the art for reducing latency in utilizing these LLMs.

SUMMARY

Implementations described herein relate to reducing latency in generating and/or rendering a given stream of natural language (NL) based output generated using a large language model (LLM). Processor(s) of a system can: receive NL based input associated with a client device, generate the given stream of NL based output utilizing the LLM that is responsive to the NL based input and that is for a given dialog context of an ongoing dialog, and cause the given stream of NL based output to be rendered at the client device. Notably, the processor(s) can employ a plurality of attribute classifiers and a multi-objective scorer to implement a blockwise controlled decoding technique in generating the given stream of NL based output utilizing the LLM. By implementing the blockwise controlled decoding technique in generating the given stream of NL based output utilizing the LLM, the processor(s) can reduce latency in generating and/or of the given stream of NL based output generated utilizing the LLM. Moreover, by implementing the blockwise controlled decoding technique in generating the given stream of NL based output utilizing the LLM, the processor(s) can improve the quality of the given stream of NL based output in terms of assurance, accuracy, creativity, etc. such that the given stream of NL based output better resonates with the user that provided the NL based input. While what resonates with the user will depend on the subjective preferences and goals of the user, by implementing the blockwise controlled decoding technique in generating the given stream of NL based output utilizing the LLM, and specifically selecting the given segments for inclusion in the given stream of NL based output using the multi-objective scorer, the given stream of NL based output generated the LLM will be made more objectively and conveniently more relevant to the user's subjective preferences by incorporating information for different dialog contexts without requiring any additional action by the user.

In various implementations, and in implementing the blockwise controlled decoding technique in generating the given stream of NL based output utilizing the LLM, the processor(s) can generate the given stream of NL based output on a segment-by-segment basis. For example, in generating a given segment of the given stream of NL based output, the processor(s) can process, using the LLM, the NL based output to generate a stream of LLM output, and determine, based on the stream of LLM output, a plurality of candidate segments for the given segment. Further, the processor(s) can process, using the plurality of attribute classifiers, each of the plurality of candidate segments, for the given segment, to generate a corresponding set of a plurality of attribute scores for each of the plurality of candidate segments. Moreover, the processor(s) can process, using the multi-objective scorer, the corresponding sets of the plurality of attribute scores, for each of the plurality of candidate segments, to select the given segment, from among the plurality of candidate segments, for inclusion in the given stream of NL based output that is responsive to the NL based input and that is for the given dialog context of the ongoing dialog. The given segment that is selected can be incorporated into the given dialog context of the ongoing dialog. This enables the processor(s) to continue selecting given additional segments for inclusion in the given stream of NL based output that is responsive to the NL based input and that is for the given dialog context of the ongoing dialog.

In some implementations, the processor(s) can cause the given stream of NL based output to be rendered at the client device in a streaming manner. For example, the processor(s) can, in response to the given segment being selected for inclusion in the given stream of NL based output that is responsive to the NL based input and that is for the given dialog context of the ongoing dialog, cause the given segment to be rendered at the client device and before any given additional segment is selected. In other implementations, the processor(s) can cause the given stream of NL based output to be rendered at the client device in a non-streaming manner. For example, the processor(s) can, in response to the given segment being selected for inclusion in the given stream of NL based output that is responsive to the NL based input and that is for the given dialog context of the ongoing dialog, refrain from causing the given segment to be rendered at the client device until the given additional segments are selected.

In some implementations, the processor(s) can generate and/or render one or more given alternative streams of NL based output generated using the LLM. For example, the processor(s) can generate each of the one or more given alternative streams of NL based output in the same or similar manner described above with respect to the given stream of NL based output. However, in generating the one or more given alternative streams of NL based output, the processor(s) can generate them with respect to a corresponding alternative dialog context. This enables the processor(s) to provide different continuation paths for the ongoing dialog. In these implementations, the one or more given alternative streams of NL based output can be rendered along with the given stream of NL based output. However, in some of these implementations, the given stream of NL based output may be rendered more prominently than the one or more given alternative streams of NL based output.

As used herein, an "dialog" may include a logically-self-contained exchange between a user and a system, such as an automated assistant system, a search system, etc. Multiple dialogs can be differentiated based on various signals, such as passage of time between dialogs, change of user context or client device context (e.g., location, before/during/after a scheduled meeting, etc.) between dialogs, detection of one or more intervening interactions (e.g., the user switches applications for a while, the user walks away from then later returns to a standalone voice-activated product), locking/sleeping of the client device between dialogs, change of client devices used in the dialogs, and so forth. As used herein, an "ongoing dialog" may include a dialog as described above, but one in which the user is actively engaged. As used herein, a "dialog context" of an ongoing dialog may include content from a dialog history for a user, content from one or more NL based inputs received from a user as part of the ongoing dialog, and/or content from one or more streams of NL based output as part of the ongoing dialog and responsive to the one or more NL based inputs. Notably, the dialog context may not include any user context and/or client device context that may also be utilized in generating the streams of NL based outputs.

The above description is provided as an overview of some implementations of the present disclosure. Further description of those implementations, and other implementations, are described in more detail below.

BRIEF DESCRIPTION OF THE DRAWINGS

FIG. 5 depicts a flowchart illustrating an example method of training a multi-objective scorer that is utilized in blockwise controlled decoding of natural language (NL) based output that is generated based on large language model (LLM) output, in accordance with various implementations.

FIG. 6 depicts a flowchart illustrating an example method of utilizing a multi-objective scorer in blockwise controlled decoding of natural language (NL) based output that is generated based on large language model (LLM) output, in accordance with various implementations.

DETAILED DESCRIPTION OF THE DRAWINGS

Figure 1:
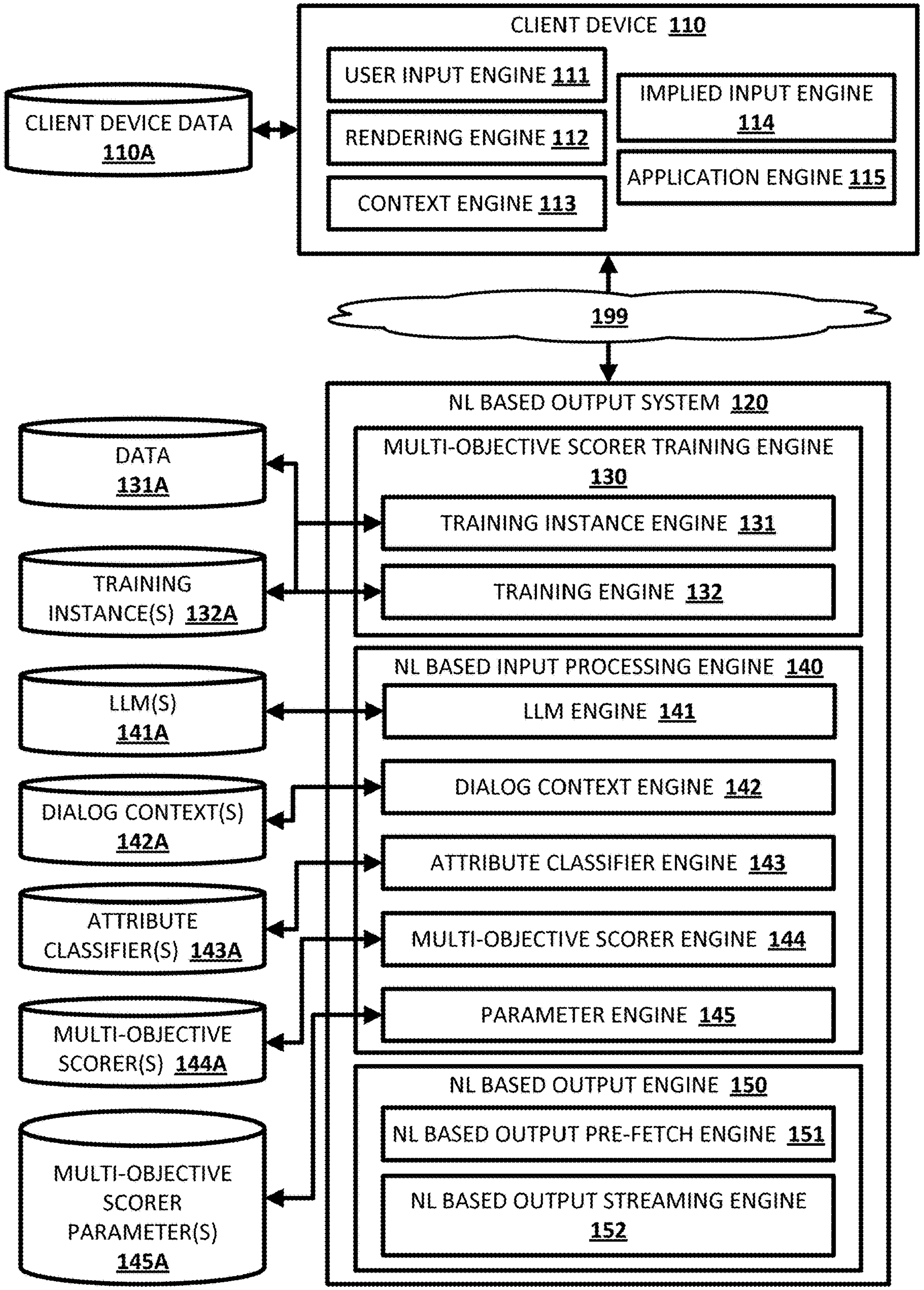
FIG. 1 depicts a block diagram of an example environment that demonstrates various aspects of the present disclosure, and in which some implementations disclosed herein can be implemented.

Turning now to FIG. 1, a block diagram of an example environment that demonstrates various aspects of the present disclosure, and in which implementations disclosed herein can be implemented is depicted. The example environment includes a client device 110 and a natural language (NL) based output system 120. In some implementations, all or aspects of the NL based output system 120 can be implemented locally at the client device 110. In additional or alternative implementations, all or aspects of the NL based output system 120 can be implemented remotely from the client device 110 as depicted in FIG. 1 (e.g., at remote server(s)). In those implementations, the client device 110 and the NL based output system 120 can be communicatively coupled with each other via one or more networks 199, such as one or more wired or wireless local area networks ("LANs," including Wi-Fi, mesh networks, Bluetooth, near-field communication, etc.) or wide area networks ("WANs", including the Internet).

The client device 110 can be, for example, one or more of: a desktop computer, a laptop computer, a tablet, a mobile phone, a computing device of a vehicle (e.g., an in-vehicle communications system, an in-vehicle entertainment system, an in-vehicle navigation system), a standalone interactive speaker (optionally having a display), a smart appliance such as a smart television, and/or a wearable apparatus of the user that includes a computing device (e.g., a watch of the user having a computing device, glasses of the user having a computing device, a virtual or augmented reality computing device). Additional and/or alternative client devices may be provided.

The client device 110 can execute one or more software applications, via application engine 115, through which NL based input can be submitted and/or NL based output and/or other output that is responsive to the NL based input can be rendered (e.g., audibly and/or visually). The application engine 115 can execute one or more software applications that are separate from an operating system of the client device 110 (e.g., one installed "on top" of the operating system)—or can alternatively be implemented directly by the operating system of the client device 110. For example, the application engine 115 can execute a web browser or automated assistant installed on top of the operating system of the client device 110. As another example, the application engine 115 can execute a web browser software application or automated assistant software application that is integrated as part of the operating system of the client device 110. The application engine 115 (and the one or more software applications executed by the application engine 115) can interact with the NL based output system 120.

In various implementations, the client device 110 can include a user input engine 111 that is configured to detect user input provided by a user of the client device 110 using one or more user interface input devices. For example, the client device 110 can be equipped with one or more microphones that capture audio data, such as audio data corresponding to spoken utterances of the user or other sounds in an environment of the client device 110. Additionally, or alternatively, the client device 110 can be equipped with one or more vision components that are configured to capture vision data corresponding to images and/or movements (e.g., gestures) detected in a field of view of one or more of the vision components. Additionally, or alternatively, the client device 110 can be equipped with one or more touch sensitive components (e.g., a keyboard and mouse, a stylus, a touch screen, a touch panel, one or more hardware buttons, etc.) that are configured to capture signal(s) corresponding to touch input directed to the client device 110.

Some instances of a NL based input described herein can be a query for a NL response that is formulated based on user input provided by a user of the client device 110 and detected via user input engine 111. For example, the query can be a typed query that is typed via a physical or virtual keyboard, a suggested query that is selected via a touch screen or a mouse of the client device 110, a spoken voice query that is detected via microphone(s) of the client device 110 (and optionally directed to an automated assistant executing at least in part at the client device 110), or an image or video query that is based on vision data captured by vision component(s) of the client device 110 (or based on NL input generated based on processing the image using, for example, object detection model(s), captioning model(s), etc.). Other instances of a NL based input described herein can be a prompt for NL content that is formulated based on user input provided by a user of the client device 110 and detected via the user input engine 111. For example, the prompt can be a typed prompt that is typed via a physical or virtual keyboard, a suggested prompt that is selected via a touch screen or a mouse of the client device 110, a spoken prompt that is detected via microphone(s) of the client device 110, or an image prompt that is based on an image captured by a vision component of the client device 110.

In various implementations, the client device 110 can include a rendering engine 112 that is configured to render content (e.g., NL based output, an indication of source(s) associated with the NL based output, and/or other content) for audible and/or visual presentation to a user of the client device 110 using one or more user interface output devices. For example, the client device 110 can be equipped with one or more speakers that enable the content to be provided for audible presentation to the user via the client device 110. Additionally, or alternatively, the client device 110 can be equipped with a display or projector that enables the content to be provided for visual presentation to the user via the client device 110.

In various implementations, the client device 110 can include a context engine 113 that is configured to determine a context (e.g., current or recent context) of the client device 110 and/or of a user of the client device 110 (e.g., an active user of the client device 110 when the client device 110 is associated with multiple users). In some of those implementations, the context engine 113 can determine a context based on data stored in client device data database 110A. The data stored in the client device data database 110A can include, for example, user interaction data that characterizes current or recent interaction(s) of the client device 110 and/or a user of the client device 110, location data that characterizes a current or recent location(s) of the client device 110 and/or a user of the client device 110, user attribute data that characterizes one or more attributes of a user of the client device 110, user preference data that characterizes one or more preferences of a user of the client device 110, user profile data that characterizes a profile of a user of the client device 110, and/or any other data accessible to the context engine 113 via the client device data database 110A or otherwise.

For example, the context engine 113 can determine a current context based on a current state of a dialog session (e.g., considering one or more recent inputs provided by a user during the dialog session), profile data, and/or a current location of the client device 110. For instance, the context engine 113 can determine a current context of "visitor looking for upcoming events in Louisville, Kentucky" based on a recently issued query, profile data, and an anticipated future location of the client device 110 (e.g., based on recently booked hotel accommodations). As another example, the context engine 113 can determine a current context based on which software application is active in the foreground of the client device 110, a current or recent state of the active software application, and/or content currently or recently rendered by the active software application. A context determined by the context engine 113 can be utilized, for example, in supplementing or rewriting NL based input that is formulated based on user input, in generating an implied NL based input (e.g., an implied query or prompt formulated independent of any explicit NL based input provided by a user of the client device 110), and/or in determining to submit an implied NL based input and/or to render result(s) (e.g., an NL based output) for an implied NL based input.

In various implementations, the client device 110 can include an implied input engine 114 that is configured to: generate an implied NL based input independent of any user explicit NL based input provided by a user of the client device 110; submit an implied NL based input, optionally independent of any user explicit NL based input that requests submission of the implied NL based input; and/or cause rendering of search result(s) or a NL based output for the implied NL based input, optionally independent of any explicit NL based input that requests rendering of the search result(s) or the NL based output. For example, the implied input engine 114 can use one or more past or current contexts, from the context engine 113, in generating an implied NL based input, determining to submit the implied NL based input, and/or in determining to cause rendering of search result(s) or a NL based output that is responsive to the implied NL based input. For instance, the implied input engine 114 can automatically generate and automatically submit an implied query or implied prompt based on the one or more past or current contexts. Further, the implied input engine 114 can automatically push the search result(s) or the NL based output that is generated responsive to the implied query or implied prompt to cause them to be automatically rendered or can automatically push a notification of the search result(s) or the NL based output, such as a selectable notification that, when selected, causes rendering of the search result(s) or the NL based output. Additionally, or alternatively, the implied input engine 114 can submit respective implied NL based input at regular or non-regular intervals, and cause respective search result(s) or respective NL based outputs to be automatically provided (or a notification thereof automatically provided). For instance, the implied NL based input can be "patent news" based on the one or more past or current contexts indicating a user's general interest in patents, the implied NL based input or a variation thereof periodically submitted, and the respective search result(s) or the respective NL based outputs can be automatically provided (or a notification thereof automatically provided). It is noted that the respective search result(s) or the respective NL based output can vary over time in view of, e.g., presence of new/fresh search result document(s) over time.

Further, the client device 110 and/or the NL based output system 120 can include one or more memories for storage of data and/or software applications, one or more processors for accessing data and executing the software applications, and/or other components that facilitate communication over one or more of the networks 199. In some implementations, one or more of the software applications can be installed locally at the client device 110, whereas in other implementations one or more of the software applications can be hosted remotely (e.g., by one or more servers) and can be accessible by the client device 110 over one or more of the networks 199.

Although aspects of FIG. 1 are illustrated or described with respect to a single client device having a single user, it should be understood that is for the sake of example and is not meant to be limiting. For example, one or more additional client devices of a user and/or of additional user(s) can also implement the techniques described herein. For instance, the client device 110, the one or more additional client devices, and/or any other computing devices of a user can form an ecosystem of devices that can employ techniques described herein. These additional client devices and/or computing devices may be in communication with the client device 110 (e.g., over the network(s) 199). As another example, a given client device can be utilized by multiple users in a shared setting (e.g., a group of users, a household, a workplace, a hotel, etc.).

The NL based output system 120 is illustrated in FIG. 1 as including a multi-objective scorer training engine 130, a NL based input processing engine 140, and a NL based output engine 150. Some of these engines can be combined and/or omitted in various implementations. Further, these engines can include various sub-engines. For instance, the multi-objective scorer training engine 130 is illustrated in FIG. 1 as including a training instance engine 131 and a training engine 132. Further, the NL based input processing engine 140 is illustrated in FIG. 1 as including a LLM engine 141, a dialog context engine 142, an attribute classifier engine 143, a multi-objective scorer engine 144, and a parameter engine 145. Moreover, the NL based output engine 150 is illustrated in FIG. 1 as including a NL based output pre-fetch engine 151 and a NL based output streaming engine 152. Similarly, some of these sub-engines can be combined and/or omitted in various implementations. Accordingly, it should be understood that the various engines and sub-engines of the NL based output system 120 illustrated in FIG. 1 are depicted for the sake of describing certain functionalities and is not meant to be limiting.

Further, the NL based output system 120 is illustrated in FIG. 1 as interfacing with various databases, such as data database 131A, training instance(s) database 132A, LLM(s) database 141A, dialog context(s) database 142A, attribute classifier(s) database 143A, multi-objective scorer(s) database 144A, and multi-objective scorer parameter(s) database 145A. Although particular engines and/or sub-engines are depicted as having access to particular databases, it should be understood that is for the sake of example and is not meant to be limiting. For instance, in some implementations, each of the various engines and/or sub-engines of the NL based output system 120 may have access to each of the various databases. Further, some of these databases can be combined and/or omitted in various implementations. Accordingly, it should be understood that the various databases interfacing with the NL based output system 120 illustrated in FIG. 1 are depicted for the sake of describing certain data that is accessible to the NL based output system 120 and is not meant to be limiting.

Figure 2:
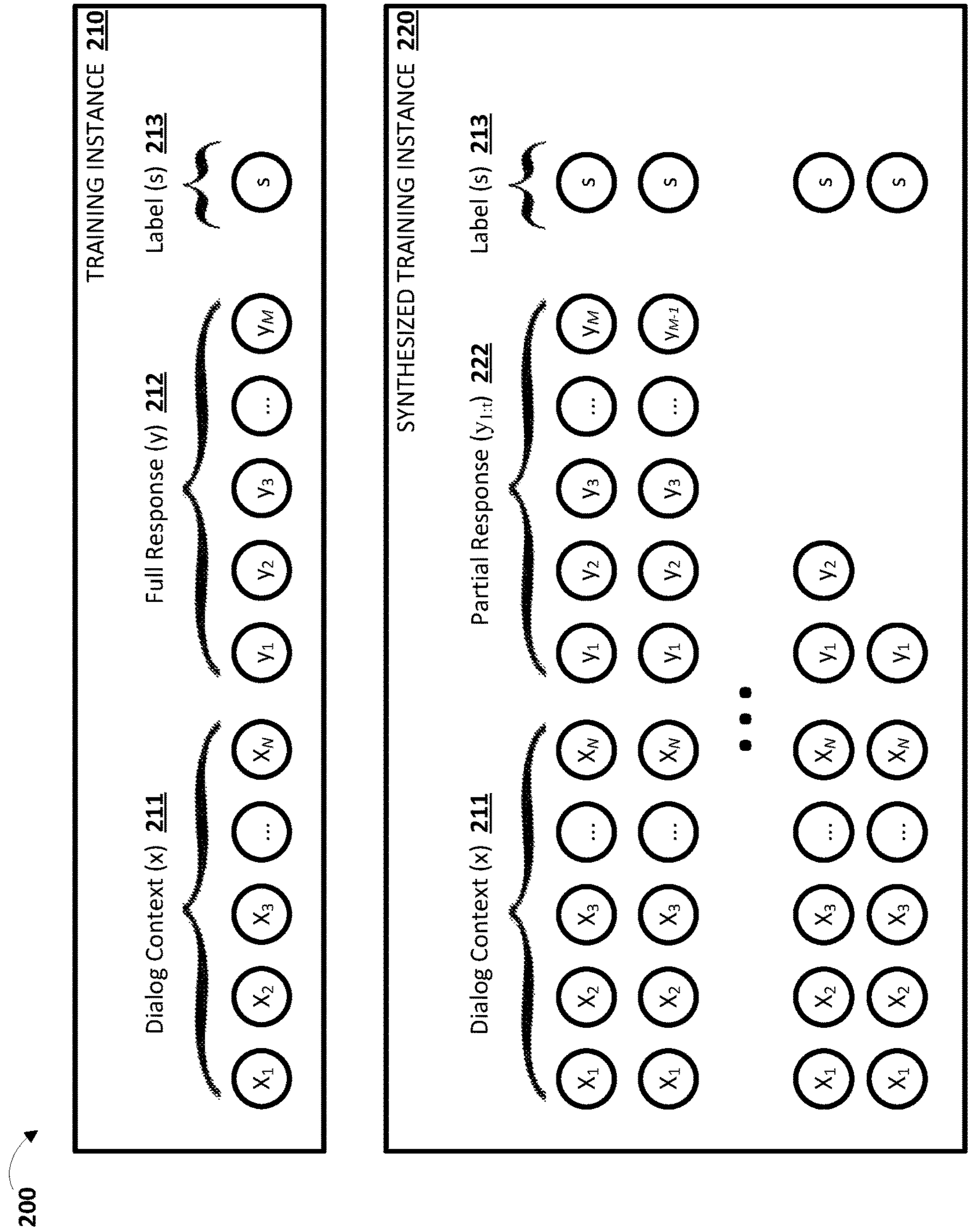
FIG. 2 depicts an example process flow for generating training instances to be subsequently utilized in training a multi-objective scorer that is utilized in blockwise controlled decoding of natural language (NL) based output that is generated based on large language model (LLM) output, in accordance with various implementations.
Figure 3:
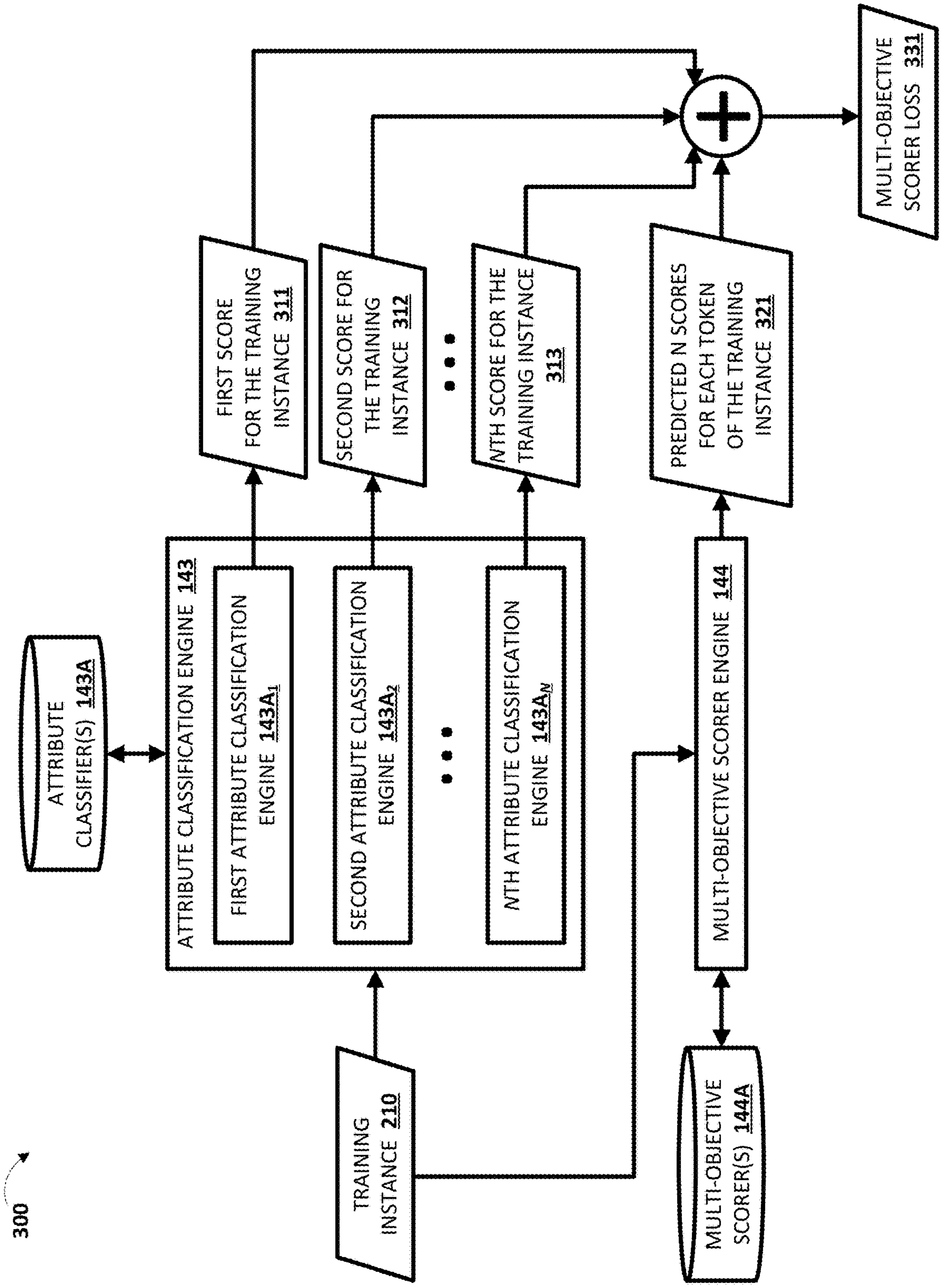
FIG. 3 depicts an example process flow for training a multi-objective scorer that is utilized in blockwise controlled decoding of natural language (NL) based output that is generated based on large language model (LLM) output, in accordance with various implementations.

As described in more detail herein (e.g., with respect to FIGS. 2-6), the NL based output system 120 can be utilized to train a multi-objective scorer (e.g., as described with respect to FIGS. 2, 3, and 5). The NL based output system 120 can employ the trained multi-objective scorer and a plurality of attribute classifiers to implement a blockwise controlled decoding technique in generating one or more stream of NL based output that is responsive to a received NL based input and that is for one or more corresponding dialog contexts of an ongoing dialog (e.g., as described with respect to FIGS. 4 and 6). Each of the one or more streams of NL based output can include a corresponding plurality of segments and can be generated on a segment-by-segment basis using the blockwise controlled decoding technique. In some implementations, each of the segments that are selected for inclusion in one or more of the streams of NL based output can be pre-fetched by the client device 110 as they are selected, but withheld from being rendered. By pre-fetching each of the segments as they are selected, latency in causing one or more of the streams of NL based output to be rendered at the client device 110 can be reduced. In additional or alternative implementation, each of the segments can be rendered in a streaming manner at the client device 110 as they are selected. By causing each of the segments to be rendered in the streaming manner at the client device 110 as they are selected, latency in causing the stream of NL based output to be rendered at the client device 110 can also be reduced. Additional description of the various engines and/or sub-engines of the NL based output system 120 is provided herein with respect to FIGS. 2-6.

Turning now to FIG. 2, an example process flow 200 for generating training instances to be subsequently utilized in training a multi-objective scorer that is utilized in blockwise controlled decoding of natural language (NL) based output that is generated based on large language model (LLM) output is depicted. For the sake of example, assume that the training instance engine 131 accesses data database 131A to obtain data for a training instance 210. The data database 131A can include any data that is suitable for training and from which a dialog context (x) 211 and full response (y) 212 can be obtained, such as conversation logs, social media posts, and/or other sources of data. Notably, the dialog context (x) 211 includes a sequence of N tokens $x_1$, $x_2$, $x_3$, . . . , $x_N$, where N is a positive integer greater than one. Further, the full response (y) 212 includes a sequence of M tokens $y_1$, $y_2$, $y_3$, . . . , $y_M$, where M is a positive integer greater than one. The tokens included in the dialog context (x) 211 and the full response (y) 212 can include, for example, words, phrases, or other semantic units. Moreover, the training instance engine 131 can generate a label (s) 213 for the training instance 210, and store the training instance 210 in the training instance(s) database 132A. The label (s) 213 can be considered a soft-label for the training instance 210.

In various implementations, and in generating the label (s) 213 for the training instance 210, the training instance engine 131 can cause the attribute classifier engine 143 to process, using a plurality of attribute classifiers stored in the attribute classifier(s) database 143A, the dialog context (s) 211 and the full response (y) 212 to generate a given set of a plurality of attribute scores for the given training instance 210 as the label (s) 213. The plurality of attribute classifiers can include, for example, one or more filtering classifiers, one or more ranking classifiers, and/or other classifiers that are trained to process a sequence of tokens to generate a corresponding attribute score. These corresponding attribute scores can be included in the given set of a plurality of the attribute scores for the given training instance 210 as the label (s) 213. For instance, the one or more filtering classifiers can include an assurance filtering classifier that is trained to generate an assurance score for the full response (y) 212 and based on processing the dialog context (s) 211 and the full response (y) 212. Also, for instance, the one or more ranking classifiers can include a quality ranking classifier that is trained to generate a quality score for the full response (y) 212 and based on processing the dialog context (s) 211 and the full response (y) 212, and an accuracy ranking classifier that is trained to generate an accuracy score for the full response (y) 212 and based on processing the dialog context (s) 211 and the full response (y) 212. The training instance engine 131 can generate a plurality of training instances in these and other manners, and the training engine 132 can train the multi-objective scorer based on the plurality of training instances.

Although FIG. 2 is described with respect to the training instance 210 being generated prior to training the multi-objective scorer and stored in the training instance(s) database 132A, it should be understood that is for the sake of example and is not meant to be limiting. Rather, it should be understood that the label (s) 213 can be generated during training of the multi-objective scorer.

For example, and referring briefly to FIG. 3, an example process flow 300 for training a multi-objective scorer that is utilized in blockwise controlled decoding of natural language (NL) based output that is generated based on large language model (LLM) output is depicted. In the example of FIG. 3, assume that the training engine 132 causes the attribute classification engine 143 to process the training instance 210. For instance, a first attribute classification engine 143$A_1$ can process, using a first attribute classifier stored in the attribute classifier(s) database 143A, the dialog context (s) 211 and the full response (y) 212 of the training instance 210 to generate a first score for the training instance 311; a second attribute classification engine 143$A_2$ can process, using a second attribute classifier stored in the attribute classifier(s) database 143A, the dialog context (s) 211 and the full response (y) 212 of the training instance 210 to generate a second score for the training instance 312; and so on such that an Nth attribute classification engine 143AN can process, using an Nth attribute classifier stored in the attribute classifier(s) database 143A, the dialog context (s) 211 and the full response (y) 212 of the training instance 210 to generate an Nth score for the training instance 313 (e.g., where N is a positive integer greater than one). In this instance, the first score for the training instance 311, the second score for the training instance 312, and at least the Nth score for the training instance 313 can be the plurality of the attribute scores for the given training instance 210 (e.g., the label (s) 213). Notably, each of the plurality of the attribute classifiers process the dialog context (s) 211 and the full response (y) 212 in generating the respective scores.

Further assume that the training engine 132 causes the multi-objective scorer engine 144 to process, using a multi-scorer stored in the multi-objective scorer(s) database 144A, the training instance 210 to generate a corresponding set of predicted N scores for each token of the training instance 321, where N is equal to the number of the plurality of attribute classifiers being utilized. Thus, the training engine 132 can compare the plurality of the attribute scores for the given training instance 210 to the corresponding set of predicted N scores for each token of the training instance 321 to generate a multi-objective scorer loss 331. Moreover, the training engine 132 can cause the multi-objective scorer to be updated based on the multi-objective scorer loss 331. Notably, in causing the multi-objective scorer engine 144 to process the training instance 210, the training engine 131 causes the multi-objective scorer engine 144 to process the dialog context (s) 211 and the full response (y) 212, but on a token-by-token basis.

For example, and referring briefly back to FIG. 2, multi-objective scorer loss 331, the training engine 132 can cause the multi-objective scorer engine 144 to process, using the multi-scorer stored in the multi-objective scorer(s) database 144A, the dialog context (s) 211 in its entirety, but only a partial response ($y_{1:t}$) 222 to generate a loss per each token of the full response (y) 212. For instance, as shown by the synthesized training instance 220, the training engine 132 can cause the multi-objective scorer engine 144 to process, using the multi-scorer stored in the multi-objective scorer(s) database 144A, the dialog context (s) 211 in its entirety, but only a first token $y_1$ of the full response (y) 212 to generate the corresponding set of predicted N scores with respect to the first token $y_1$. Further, the training engine 132 can cause the multi-objective scorer engine 144 to process, using the multi-scorer stored in the multi-objective scorer(s) database 144A, the dialog context (s) 211 in its entirety, but only a second token $y_2$ of the full response (y) 212 to generate the corresponding set of predicted N scores with respect to the second token $y_2$. This training engine can cause this process to be repeated for each of the tokens of the full response (y) 212. Notably, in some implementations, the synthesized training instance 220 can be materialized by the training instance engine 131 and based on the training instance 210. However, in other implementations, the synthesized training instance 220 may not actually be materialized.

Accordingly, in generating the multi-objective scorer loss 331, the training engine 132 can compare the first score for the training instance 311, the second score for the training instance 312, and at least the Nth score for the training instance 313 (e.g., generated using the plurality of attribute classifiers) to the corresponding set of predicted N scores with respect to the first token $y_1$ (e.g., generated using the multi-objective scorer) to generate a first token loss. Further, the training engine 132 can compare the first score for the training instance 311, the second score for the training instance 312, and at least the Nth score for the training instance 313 (e.g., generated using the plurality of attribute classifiers) to the corresponding set of predicted N scores with respect to the second token $y_2$ (e.g., generated using the multi-objective scorer) to generate a second token loss. Moreover, the training engine 132 can generate the multi-objective scorer loss 331 as a function of at least the first token loss and the second token loss. This process is similar to a deep Q-network (DQN) algorithm utilized in reinforcement learning in that the multi-objective scorer attempts to predict the given set of corresponding scores for the full response (y) 212 as a whole, but only based on a subset of tokens of the full response (y) 212.

Figure 4:
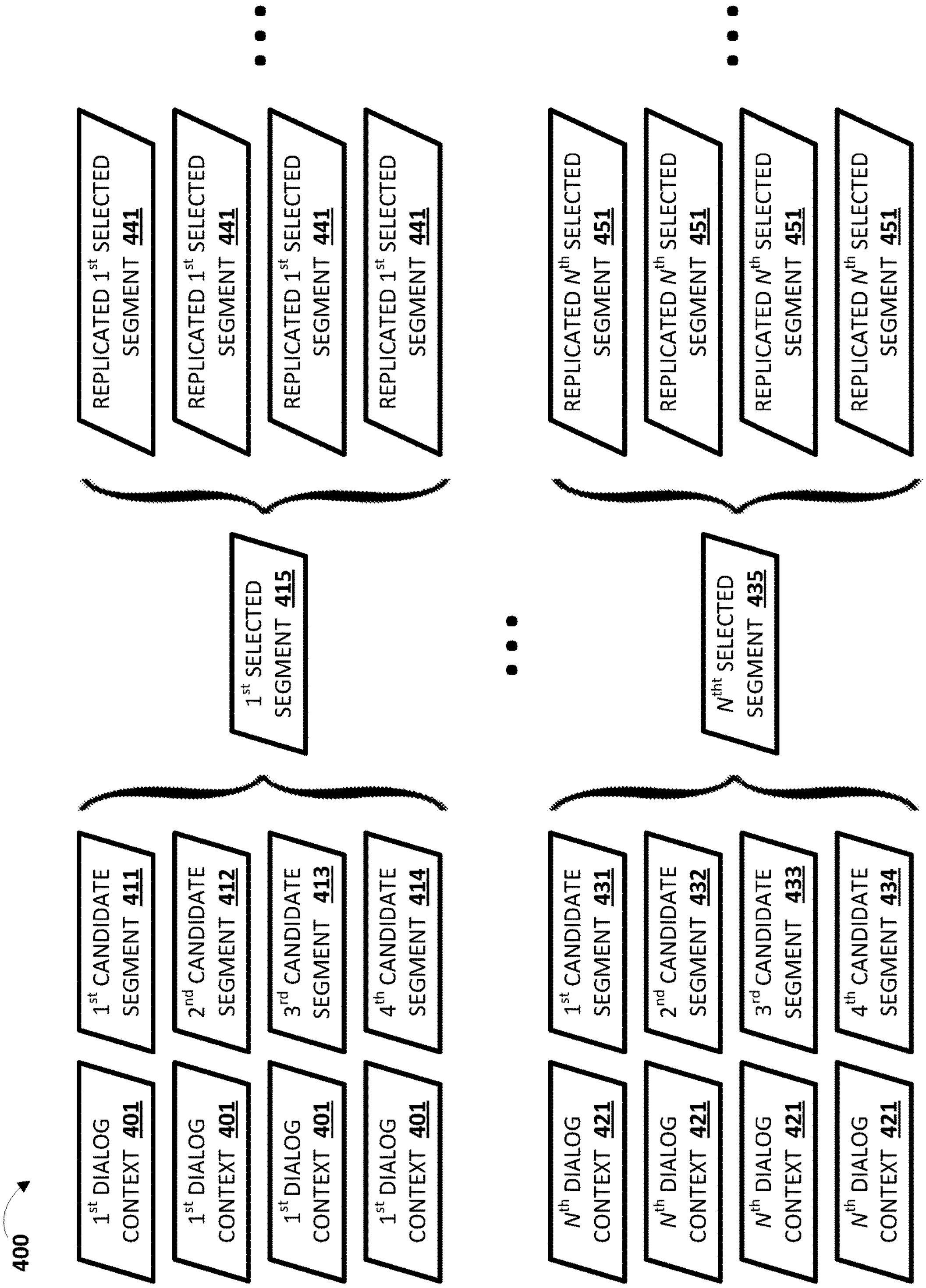
FIG. 4 depicts an example process flow for utilizing a multi-objective scorer in blockwise controlled decoding of natural language (NL) based output that is generated based on large language model (LLM) output, in accordance with various implementations.

Turning now to FIG. 4, an example process flow 400 for utilizing a multi-objective scorer in blockwise controlled decoding of natural language (NL) based output that is generated based on large language model (LLM) output is depicted. For the sake of example, assume that a user is engaged in an ongoing dialog with a system (e.g., including processor(s) and storage devices) that utilizes the NL based output system 120 from FIG. 1. Further assume that the user provides NL based input to the system. In this example, and in generating a given stream of NL based output that are responsive to the NL based output, the system can utilize the multi-objective scorer (e.g., trained according FIGS. 2 and 3) to implement blockwise controlled decoding of the a given stream of NL based output.

For instance, assume there is a first dialog context 401 of the ongoing dialog determined by the dialog context engine 142 (e.g., and updated in the dialog context(s) database 142A as the ongoing dialog has progressed). In generating one or more of the given streams of NL based output, the system can cause the LLM engine 141 to process, using a LLM stored in the LLM(s) database 141A, the NL based input to generate a stream of LLM output. The LLM can include, for example, any LLM that is stored in the LLM(s) database 141A, such as PaLM, BARD, BERT, LaMDA, Meena, GPT, and/or any other LLM, such as any other LLM that is encoder-only based, decoder-only based, sequence-to-sequence based and that optionally includes an attention mechanism or other memory. The stream of LLM output can include, for example, a probability distribution over a sequence of tokens, such as words, phrases, or other semantic units, that are predicted to be responsive to the NL based input. Notably, the LLM can include billions of weights and/or parameters that are learned through training the LLM on enormous amounts of diverse data. This enables the LLM to generate the LLM output as the probability distribution over the sequence of tokens.

Further, the system can cause the LLM engine 141 to determine, based on the probability distribution over the sequence of tokens, a plurality of candidate segments for a given segment of the given stream of NL based output. The LLM engine 141 can, for example, perform matrix multiplication using the weights and/or parameters of the LLM to determine the plurality of candidate segments and based on the probability distribution over the sequence of tokens. Accordingly, and as shown in FIG. 4, the system can determine a first candidate segment 411 for the first dialog context 401, a second candidate segment 412 for the first dialog context 401, a third candidate segment 413 for the first dialog context 401, a fourth candidate segment 414 for the first dialog context 401, and so on.

Moreover, the system can cause the attribute classifier engine 143 to process, using a plurality of attribute classifiers stored in the attribute classifier(s) database 143A, each of the plurality of candidate segments to generate a corresponding set of a plurality of attribute scores for each of the plurality of candidate segments. For instance, the system can process, using the plurality of attribute classifiers, the first candidate segment 411 for the first dialog context 401 to generate an assurance score, a quality score, an accuracy score, etc. for the first candidate segment 411 for the first dialog context 401. Further, the system can process, using the plurality of attribute classifiers, the second candidate segment 412 for the first dialog context 401 to generate an assurance score, a quality score, an accuracy score, etc. for the second candidate segment 412 for the first dialog context 401. Moreover, the system can process, using the plurality of attribute classifiers, the third candidate segment 413 for the first dialog context 401 to generate an assurance score, a quality score, an accuracy score, etc. for the third candidate segment 413 for the first dialog context 401. Furthermore, the system can process, using the plurality of attribute classifiers, the fourth candidate segment 414 for the first dialog context 401 to generate an assurance score, a quality score, an accuracy score, etc. for the fourth candidate segment 414 for the first dialog context 401.

Furthermore, the system can cause the multi-objective classifier engine 144 to process, using the multi-objective scorer stored in the multi-objective scorer(s) database 144A (e.g., and trained as described with respect to FIGS. 2 and 3), the corresponding sets of the attribute scores for each of the plurality of candidate segments to select the given candidate segment, and from among the plurality of candidate segments, as a first selected segment 415. For instance, the system can utilize the multi-objective scorer to filter and/or rank the plurality of candidate segments, and can select the given candidate segment based on the filtering and/or ranking. As one non-limiting example, the system can utilize the multi-objective scorer to filter out any of the candidate segments that have assurance scores that fail to satisfy an assurance score threshold, and can rank the remaining candidate segments based on the quality scores and the accuracy scores. Notably, since the multi-objective scorer is trained in the manner described with respect to FIGS. 3 and 4, the first selected segment 415 is selected to maximize, for example, the assurance scores, the quality scores, and the accuracy scores of the one or more streams of the NL based output as a whole even though the one or more streams of the NL based output are not yet complete. Accordingly, the first selected segment 415 may not be limited to the candidate segment that includes the highest assurance score, quality score, or the accuracy score in isolation. Put another way, by using the multi-objective scorer, the system provides a flexible approach to balancing assurance, quality, accuracy, creativity, and/or other factors in generating the one or more streams of NL based output.

As one non-limiting example of providing this flexible approach to balancing assurance, quality, accuracy, creativity, and/or other factors in generating the one or more streams of NL based output, the multi-objective scorer can be associated with a plurality of parameters (e.g., stored in the multi-objective scorer parameter(s) database 145A). The plurality of parameters can each be tunable in that they are dynamically adjustable throughout the ongoing dialog to dynamically adjust the filtering and ranking of the candidate segments. Accordingly, if the system determines that the dialog context is unsafe (e.g., related to a taboo topic, harm of person or property, or the like), the system can cause the parameter engine 145 to dynamically adjust a threshold associated with the assurance filtering criteria to prevent unsafe NL based outputs from being generated. Notably, the system can cause the parameter engine 145 to dynamically adjust this threshold without the multi-objective scorer having to be retrained, thereby offering additional flexibility in this approach to balancing assurance, quality, accuracy, creativity, and/or other factors in generating the one or more streams of NL based output.

In various implementations, the first selected segment 415 can be replicated as shown by 441 in FIG. 4. By replicating the first selected segment 415 as shown in FIG. 4, the first selected segment 415 can be incorporated into the first dialog context 401 and enable the system to generate given additional segments for the first dialog context 401 with respect to the first selected segment 415. Accordingly, the system can continue determining given additional candidate segments, and selecting given additional segments for inclusion in the given stream of NL based output in this manner until the one or more given streams of NL based output. Although the above description is described with respect to the first dialog context 401 and only generating the given stream of NL based output that is for the first dialog context 401, it should be understood that is for the sake of example and is not meant to be limiting.

For example, the same process can be repeated for an Nth dialog context 421, where N is a positive integer greater than one, to generate one or more given alternative streams of NL based output for alternative dialog contexts. Accordingly, and as also shown in FIG. 4, the system can determine a first candidate segment 431 for the Nth dialog context 421, a second candidate segment 432 for the Nth dialog context 421, a third candidate segment 433 for the Nth dialog context 421, a fourth candidate segment 434 for the Nth dialog context 421, and so on. Further, and as also shown in FIG. 4, a given alternative segment can be selected as the Nth selected segment 435, and the Nth selected segment 435 can be replicated as shown by 451 in FIG. 4. By replicating the Nth selected segment 435 as shown in FIG. 4, the Nth selected segment 435 can be incorporated into the Nth dialog context 421 and enable the system to generate given additional alternative segments for the first dialog context 401 with respect to the first selected segment 415. Accordingly, the system can continue determining given additional alternative candidate segments, and selecting given additional alternative segments for inclusion in the one or more given streams of NL based output in this manner until the one or more given streams of NL based output.

By not only generating the given stream of NL based output that is for the first dialog context 401, but also the given alternative stream of NL based output that is for the Nth dialog context 421, multiple streams of NL based output can be rendered. This enables the user to effectively choose which stream of NL based output to utilize in continuing the ongoing dialog. Notably, both the given stream of NL based output that is for the first dialog context 401 and the given alternative stream of NL based output that is for the Nth dialog context 421 can be generated in a parallel manner and using the blockwise controlled decoding technique described herein. As a result, latency in generating and/or rendering the given stream of NL based output that is for the first dialog context 401 and/or the given alternative stream of NL based output that is for the Nth dialog context 421 is reduced. This reduction in latency can be achieved during the generating of these streams since the selected segments of these streams of NL based output are evaluated as they are generated, rather than as a whole when these streams are complete. Further, this reduction in latency can be achieved during the rendering of these streams since the selected segments of these streams of NL based output can be rendered on a segment-by-segment basis as the segments are selected and prior these streams as a whole being complete.

Turning now to FIG. 5, a flowchart illustrating an example method 500 of training a multi-objective scorer that is utilized in blockwise controlled decoding of natural language (NL) based output that is generated based on large language model (LLM) output is depicted. For convenience, the operations of the method 500 are described with reference to a system that performs the operations. This system of the method 500 includes one or more processors, memory, and/or other component(s) of computing device(s) (e.g., client device 110 of FIG. 1, NL based output system 120 of FIG. 1, computing device 710 of FIG. 7, one or more servers, and/or other computing devices). Moreover, while operations of the method 500 are shown in a particular order, this is not meant to be limiting. One or more operations may be reordered, omitted, and/or added.

At block 552, the system obtains a plurality of training instances for training a multi-objective scorer, each of the plurality of training instances including a corresponding dialog context and a corresponding NL based output that is associated with the corresponding dialog context. In some implementations, and as described with respect to FIGS. 2 and 3, the system can obtain data from one or more databases (e.g., the data database 131A), and can generate the plurality of training instances based on the data. In some versions of those implementations, the system can generate the training instances prior to initiating training of the multi-objective scorer, and store the plurality of training instances in one or more databases (e.g., the training instance(s) database 132A). In additional or alternative implementations, the system can generate the training instances during training of the multi-objective scorer (e.g., in an "in-the-loop" manner). In other implementations, the plurality of training instances may have been previously generated and already stored in one or more databases (e.g., the training instance(s) database 132A).

At block 554, the system processes a given training instance from among the plurality of training instances. For example, at sub-block 554A, the system processes, using a plurality of attribute classifiers, the corresponding dialog context and the corresponding NL based output, in its entirety, that is associated with the corresponding dialog context to generate a given set of a plurality of attribute scores for the given training instance. For example, and as described with respect to FIGS. 2 and 3, the system can utilize the given set of the plurality of attribute scores for the given training instance as a soft label in subsequently generating a multi-objective scorer loss. Notably, in generating the given set of the plurality of attribute scores as the soft label for the given training instance, the system causes the plurality of attribute classifiers to process the corresponding NL based output in its entirety. Accordingly, the plurality of attribute scores for the given training instance include scores generated for the corresponding NL based output as a whole.

Further, at sub-block 554B, the system processes, using the multi-objective scorer, the corresponding dialog context and the corresponding NL based output, on a token-by-token basis, that is associated with the corresponding dialog context to generate a given corresponding set of a plurality of predicted attribute scores for each token of the corresponding NL based output. Notably, in generating the given corresponding set of a plurality of predicted attribute scores for each token of the corresponding NL based output, the system generates the corresponding set of a plurality of predicted attribute scores for each token of the corresponding NL based output (e.g., rather than the corresponding NL based output in its entirety). Put another way, the multi-objective scorer attempts to predict the plurality of attribute scores for the given training instance include scores generated for the corresponding NL based output as a whole, but on a token-by-token basis. Accordingly, given a single token of the corresponding NL based output, the system causes the multi-objective scorer to predict the plurality of attribute scores for all tokens of the corresponding NL based output even though not all of the tokens are processed by the multi-objective scorer.

At block 556, the system determines, based on (1) the given set of the plurality of attribute scores for the given training instance and (2) the given corresponding set of the plurality of predicted attribute scores for each token of the corresponding NL based output, a given multi-objective scorer loss. At block 558, the system causes, based on the given multi-objective scorer loss, the multi-objective scorer to be updated. For example, and as described with respect to FIGS. 2 and 3, the system can compare the given corresponding set of the plurality of predicted attribute scores for a first token of the corresponding NL based output the given set of the plurality of attribute scores for the corresponding NL based output as a whole to generate a first token loss for the first token of the corresponding NL based output. Similarly, the system can compare the given corresponding set of the plurality of predicted attribute scores for a second token of the corresponding NL based output the given set of the plurality of attribute scores for the corresponding NL based output as a whole to generate a second token loss for the second token of the corresponding NL based output. This process can be repeated for each of the tokens of the corresponding NL based output. Moreover, the system can generate the given multi-objective scorer loss as a function of each of the individual token losses (e.g., the first token loss, the second token loss, and/or other token losses). Furthermore, the system can cause the given multi-objective scorer loss to be, for example, backpropagated across the multi-objective scorer At block 560, the system determines whether to continue training the multi-objective scorer based on an additional training instance. The system can determine to continue training the multi-objective scorer based on, for example, whether there is an additional training instance, whether the multi-objective scorer has been trained based on a threshold quantity of training instances, whether the multi-objective scorer has been trained for a threshold duration of time, whether the multi-objective scorer has achieved a threshold level of performance (e.g., precision and/or recall), and/or based on other factors. If, at an iteration of block 560, the system determines to continue training the multi-objective scorer based on an additional training instance, then the system returns to block 554 to process the additional training instance in the same or similar manner described with respect to the given training instance. If, at an iteration of block 560, the system determines not to continue training the multi-objective scorer based on an additional training instance, then the system proceeds to block 562.

At block 562, the system causes the multi-objective scorer to be utilized in blockwise controlled decoding of NL based output generated using a LLM (e.g., as described with respect to FIGS. 4 and 6). By training the multi-objective scorer in this manner, the blockwise controlled decoding achieves reduced latency in generating and/or rendering of the NL based output that is generated using the LLM.

Turning now to FIG. 6, a flowchart illustrating an example method 600 of utilizing a multi-objective scorer in blockwise controlled decoding of natural language (NL) based output that is generated based on large language model (LLM) output is depicted. For convenience, the operations of the method 600 are described with reference to a system that performs the operations. This system of the method 600 includes one or more processors, memory, and/or other component(s) of computing device(s) (e.g., client device 110 of FIG. 1, NL based output system 120 of FIG. 1, computing device 710 of FIG. 7, one or more servers, and/or other computing devices). Moreover, while operations of the method 600 are shown in a particular order, this is not meant to be limiting. One or more operations may be reordered, omitted, and/or added.

At block 652, the system receives NL based input associated with a client device. In some implementations, the NL based input can be one formulated based on explicit user interface input at a client device (e.g., detected via the user input engine 111), such as typed input, voice input, input to cause an image to be captured or selected, etc. In some of those implementations, the NL based input can be a query. The query can be, for example, a voice query, a typed query, an image-based query, or a multimodal query (e.g., that includes voice input, and an image or video). In some implementations, when the query includes content that is not in textual format, the system can convert the query to a textual format or other format. For example, if the query is a voice query, then the system can perform automatic speech recognition (ASR) to convert the query to textual format. As another example, if the query is a multimodal query that includes an image or video of an avocado and a voice input of "is this healthy", then the system can perform ASR to convert the voice input to text form and can perform image or video processing on the image or video to recognize an avocado is present in the image or video, and can perform co-reference resolution to replace "this" with "an avocado", resulting in a textual format query of "is an avocado healthy".

In some implementations, the NL based input can be received in an application environment of one or more software applications that are accessible at the client device, such as a browser software application, an automated assistant software application, etc. (e.g., via the application engine 115). In additional or alternative versions of those implementations, the system can augment the NL based input (e.g., augment the explicit NL based input) with additional information, such as one or more past or current contexts of the client device and/or a user of the client device (e.g., via the context engine 113).

In other implementations, the NL based input can alternatively be implied NL based input, such as an inferred/parameterless query, such as one formulated and/or submitted independent of any explicit user NL based input directed to formulating the implied NL based input (e.g., as described with respect to the context engine 113 and/or the implied input engine 114 of FIG. 1). For example, the query can be an implied query that is automatically generated based on profile data and that is automatically submitted. For instance, the implied NL based input can be an implied query of "machine learning", based on profile data indicating interest in machine learning topic(s). As another example, the implied NL based input can be an implied query that is automatically generated and/or automatically submitted based on a current and/or recent context. As yet another example, the implied NL based input can be an implied query that is submitted based on the user providing some indication of a desire to perform a search (e.g., pushing a search button, performing a search touch gesture, accessing a particular screen or state of an application), but that is generated automatically based on content currently being displayed at a client device, location, time of day, and/or other context signal(s).

At block 654, the system processes, using a LLM, the NL based input to generate a stream of LLM output. For example, and as described above with respect to FIG. 4, the system can process, using a LLM stored in the LLM(s) database 141A, the NL based input to generate the stream of LLM output. The stream of LLM output can be, for example, a probability distribution over a sequence of tokens, such as words, phrases, or other semantic units, that are predicted to be responsive to the NL based input. In some implementations, the sequence of tokens includes words, phrases, or other semantic units that correspond to a vocabulary. In some versions of these implementations, the vocabulary can optionally be restricted to that of a particular persona or a particular domain. This enables the LLM to reflect the particular persona or appear well-versed in the particular domain. As described herein, the LLM output can be considered a stream in various implementations in that, as each word or phrase of the NL based input is being processed using the LLM, the probability distribution over the sequence of tokens can be continuously updated and with respect any previously selected segments for a given stream of NL based output.

At block 656, the system determines, based on the stream of LLM output, a plurality of candidate segments for a given segment of a given stream of NL based output that is responsive to the NL based input and that is for a given dialog context of an ongoing dialog. For example, the system can determine, based on the probability distribution over the sequence of tokens, the plurality of candidate segments for the given segment of the given stream of NL based output. In some implementations, the plurality of candidate segments can include a fixed number of candidate segments. For instance, the fixed number of candidate can include the two most likely candidate segments that are predicted to be responsive to the NL based input for the given segment, the four most likely candidate segments that are predicted to be responsive to the NL based input for the given segment, the 16 most likely candidate segments that are predicted to be responsive to the NL based input for the given segment, and/or any other fixed number of candidate segments. In other implementations, the plurality of first candidate segments may not include a fixed number of candidate segments. Rather, in these implementations, the plurality of candidate segments can include any number of candidate segments corresponding that are associated with one or more probabilities from the probability distribution over the sequence of tokens that satisfy a threshold probability.

In some implementations, each of the plurality of candidate segments can include a fixed number of tokens. For instance, each of the plurality of candidate segments can include a single token, 16 tokens, 32 tokens, and/or any other fixed number or tokens. In other implementations, each of the plurality of candidate segments may not include a fixed number of tokens. For instance, each of the plurality of candidate segments can include tokens that correspond to words and that form a corresponding sentence, but each corresponding sentence can be of varying length. Also, for instance, each of the plurality of candidate segments can include tokens up to a corresponding punctuation mark, such as a corresponding period, a corresponding comma, a corresponding dash, or the like.

At block 658, the system processes, using a plurality of attribute classifiers, each of the plurality of candidate segments, for the given segment, to generate a corresponding set of a plurality of attribute scores for each of the plurality of candidate segments. At block 660, the system processes, using a multi-objective scorer, the corresponding sets of the plurality of attribute scores, for each of the plurality of candidate segments, to select the given segment, from among the plurality of candidate segments, for inclusion in the given stream of NL based output that is responsive to the NL based input and that is for the given dialog context of the ongoing dialog. The system can process each of the plurality of candidate segments to generate the corresponding set of the plurality of attribute scores for each of the plurality of candidate segments using the plurality of attribute classifiers, and can process the corresponding sets of the plurality of attribute scores to select the given segment using the multi-objective scorer in the same or similar manner described with respect to FIG. 4.

At block 662, the system determines whether there is an alternative dialog context for the ongoing dialog. In some implementations, there may be no alternative dialog context for the ongoing dialog. In other implementations, there may be a pre-defined number of alternative dialog contexts to enable the user to subsequently choose different conversation paths for the ongoing dialog. In implementations where there are alternative dialog contexts, the system can track the different dialog contexts (e.g., using the dialog context engine 142).

If, at an iteration of block 662, the system determines that there is an alternative dialog context for the ongoing dialog, then the system returns to block 656 to determine, based on the stream of LLM output, a plurality of alternative candidate segments for a given alternative segment of a given alternative stream of NL based output that is also responsive to the NL based input, but that is for the given alternative dialog context of the ongoing dialog. The system can perform an additional iteration of block 658-662 with respect to the given alternative dialog context. Put another way, the system not only performs blockwise controlled decoding for the given dialog context, but also for any given alternative dialog contexts. However, it should be noted that the blockwise controlled decoding for any given alternative dialog contexts can be performed in a parallel manner with the blockwise controlled decoding for the given dialog context. If, at an iteration of block 662, the system determines that there is no alternative dialog context for the ongoing dialog (or no additional alternative dialog context at a subsequent iteration of block 662), then the system proceeds to block 664.

At block 664, the system determines whether there is a given additional segment in the given stream of NL based output that is for the given dialog context (or any given alternative stream of NL based output that is for any given alternative dialog context). The system can determine whether there is a given additional segment in the given stream of NL based output that is for the given dialog context (or any given alternative stream of NL based output that is for any given alternative dialog context) based on, for example, whether the given stream of NL based output or any given alternative stream of NL based output is complete, whether a threshold quantity of blockwise controlled decoding steps have been performed, and/or based on other conditions. Notably, by virtue of having multiple different dialog contexts in some implementations, the system can determine that there is a given additional segment in one or more of the different dialog contexts, but that there is no given additional segment in one or more other different dialog contexts.

If, at an iteration of block 664, the system determines that there is a given additional segment in the given stream of NL based output, then the system returns to block 654 to continue processing the NL based input to generate the stream of LLM output using the LLM. The system can perform an additional iteration of block 656-664 with respect to the given alternative additional segment.

If, at an iteration of block 664, the system determines that there is not a given additional segment in the given stream of NL based output, then the system proceeds to block 666. At block 666, the system causes the given stream(s) of NL based output to be rendered at the client device. In some implementations, as each of the segments are selected, the system can (e.g., using the NL based output pre-fetch engine 151) transmit an indication to the client device that a given segment to be included in the given stream of NL based output has been selected and/or one of the given alternative streams of NL based output (e.g., via an API server). This enables the client device to pre-fetch each of the segments as they are selected by the system for inclusion in the respective streams of NL based output. Alternatively, as each of the segments are selected, the system can transmit each of the segments as they are selected by the system for inclusion in the stream of NL based output and to the client device. Notably, in these implementations, the respective streams of NL based output may not be rendered at the client device until the respective streams of NL based output are complete (e.g., rendered in a non-streaming manner). Nonetheless, by enabling the client device to pre-fetch each of the segments as they are selected by the system for inclusion in the stream of NL based output, latency in causing the stream of NL based output to be rendered at the client device can be reduced. In additional or alternative implementations, as each of the segments are selected, the system can (e.g., using the NL based output streaming engine 152) transmit each of the segments to the client device as they are selected by the system for inclusion in the respective streams of NL based output. Notably, in these implementations, the respective streams of NL based output can be rendered at the client device prior to the respective streams of NL based output being complete (e.g., rendered in a streaming manner). By enabling the client device to stream each of the segments as they are selected by the system for inclusion in the stream of NL based output, latency in causing the stream of NL based output to be rendered at the client device can be reduced.

In some implementations, the respective streams of NL based output can be visually rendered via a display of the client device (e.g., via the rendering engine 112). For example, textual data corresponding to the respective streams of NL based output can be transmitted to the client device for visual rendering via the display of the client device. In additional or alternative implementations, the respective streams of NL based output can be audibly rendered via speaker(s) of the client device (e.g., via the rendering engine 112). In some versions of these implementations, textual data corresponding to the respective streams of NL based output can be transmitted to the client device and the client device can process, using text-to-speech model(s), synthesized speech audio data to generate synthesized speech capturing the textual data corresponding to the stream of NL based output. The synthesized audio data can be audibly rendered via the speaker(s) of the client device. In other versions of those implementations, the synthesized speech audio data can be generated remotely from the client device (e.g., at a remote server in implementations where the system is hosted at the remote server), and the synthesized speech audio data can be transmitted to the client device and audibly rendered via the speaker(s) of the client device.

In some implementations that include multiple disparate dialog contexts, the given stream of NL based output that is for the given dialog context may be rendered more prominently than other given alternative streams of NL based output that are associated with given alternative dialog contexts. Nonetheless, the user can provide additional user input at the client device to select one of the other given alternative streams of NL based output to change the conversation path of the ongoing dialog. For instance, the user can initially be presented with the given stream of NL based output, but be provided with one or more graphical user interface elements to view one of the other given alternative streams of NL based output. This enables the user to respond to the one of the other given alternative streams of NL based output, and in lieu of the given stream of NL based output, to change the conversation path of the ongoing dialog.

Figure 7:
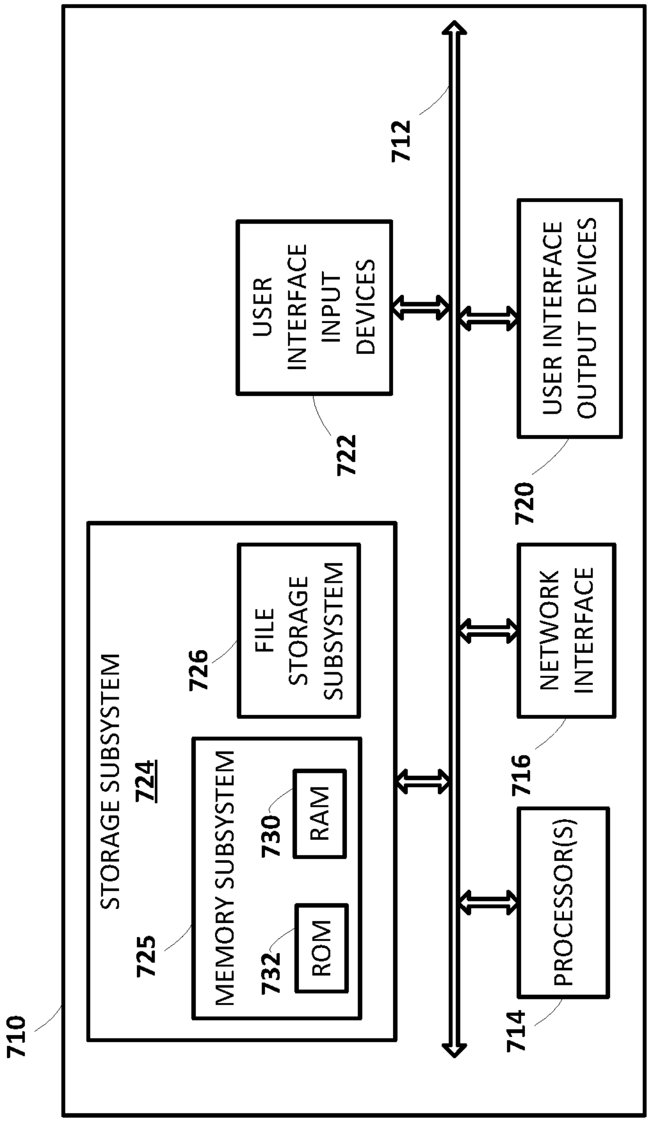
FIG. 7 depicts an example architecture of a computing device, in accordance with various implementations.

Turning now to FIG. 7, a block diagram of an example computing device 710 that may optionally be utilized to perform one or more aspects of techniques described herein is depicted. In some implementations, one or more of a client device, cloud-based automated assistant component(s) or other cloud-based software application component(s), and/or other component(s) may comprise one or more components of the example computing device 710.

Computing device 710 typically includes at least one processor 714 which communicates with a number of peripheral devices via bus subsystem 712. These peripheral devices may include a storage subsystem 724, including, for example, a memory subsystem 725 and a file storage subsystem 726, user interface output devices 720, user interface input devices 722, and a network interface subsystem 716. The input and output devices allow user interaction with computing device 710. Network interface subsystem 716 provides an interface to outside networks and is coupled to corresponding interface devices in other computing devices.

User interface input devices 722 may include a keyboard, pointing devices such as a mouse, trackball, touchpad, or graphics tablet, a scanner, a touch screen incorporated into the display, audio input devices such as voice recognition systems, microphones, and/or other types of input devices. In general, use of the term "input device" is intended to include all possible types of devices and ways to input information into computing device 710 or onto a communication network.

User interface output devices 720 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 710 to the user or to another machine or computing device.

Storage subsystem 724 stores programming and data constructs that provide the functionality of some or all of the modules described herein. For example, the storage subsystem 724 may include the logic to perform selected aspects of the methods disclosed herein, as well as to implement various components depicted in FIG. 1.

These software modules are generally executed by processor 714 alone or in combination with other processors. Memory 725 used in the storage subsystem 724 can include a number of memories including a main random access memory (RAM) 730 for storage of instructions and data during program execution and a read only memory (ROM) 732 in which fixed instructions are stored. A file storage subsystem 726 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 726 in the storage subsystem 724, or in other machines accessible by the processor(s) 714.

Bus subsystem 712 provides a mechanism for letting the various components and subsystems of computing device 710 communicate with each other as intended. Although bus subsystem 712 is shown schematically as a single bus, alternative implementations of the bus subsystem 712 may use multiple busses.

Computing device 710 can be of varying types including a workstation, server, computing cluster, blade server, server farm, or any other data processing system or computing device. Due to the ever-changing nature of computers and networks, the description of computing device 710 depicted in FIG. 7 is intended only as a specific example for purposes of illustrating some implementations. Many other configurations of computing device 710 are possible having more or fewer components than the computing device depicted in FIG. 7.

In situations in which the systems described herein collect or otherwise monitor personal information about users, or may make use of personal and/or monitored information), the users may be provided with an opportunity to control whether programs or features collect user information (e.g., information about a user's social network, social actions or activities, profession, a user's preferences, or a user's current geographic location), or to control whether and/or how to receive content from the content server that may be more relevant to the user. Also, certain data may be treated in one or more ways before it is stored or used, so that personal identifiable information is removed. For example, a user's identity may be treated so that no personal identifiable information can be determined for the user, or a user's geographic location may be generalized where geographic location information is obtained (such as to a city, ZIP code, or state level), so that a particular geographic location of a user cannot be determined. Thus, the user may have control over how information is collected about the user and/or used.

In some implementations, a method implemented by one or more processors is provided, and includes: receiving natural language (NL) based input associated with a client device and as part of an ongoing dialog; and generating, based on processing the NL based input using a large language model (LLM), a given stream of NL based output that is responsive to the NL based input and that is for a given dialog context of the ongoing dialog. The given stream of NL based output includes a plurality of segments. Further, generating a given segment, of the plurality of segments, of the given stream of NL based output that is responsive to the NL based input and based on processing the NL based input using the LLM includes: processing, using the LLM, the NL based input to generate a stream of LLM output; determining, based on the stream of LLM output, a plurality of candidate segments for the given segment; processing, using a plurality of attribute classifiers, each of the plurality of candidate segments, for the given segment, to generate a corresponding set of a plurality of attribute scores for each of the plurality of candidate segments; and processing, using a multi-objective scorer, the corresponding sets of the plurality of attribute scores, for each of the plurality of candidate segments, to select the given segment, from among the plurality of candidate segments, for inclusion in the given stream of NL based output that is responsive to the NL based input and that is for the given dialog context of the ongoing dialog. Moreover, the method further includes, in response to determining that the given stream of NL based output that is responsive to the NL based input is to be rendered at the client device: causing the given stream of NL based output to be rendered at the client device and that is for the given context of the ongoing dialog.

These and other implementations of technology disclosed herein can optionally include one or more of the following features.

In some implementations, the given dialog context for the ongoing dialog includes at least the given segment. Further, generating a given additional segment, of the plurality of segments and that follows the given segment, of the given stream of NL based output that is responsive to the NL based input and based on processing the NL based input using the LLM can include: determining, based on the stream of LLM output, a plurality of additional candidate segments for the given additional segment; processing, using the plurality of attribute classifiers, each of the plurality of additional candidate segments, for the given additional segment, to generate a corresponding additional set of a plurality of attribute scores for each of the plurality of additional candidate segments; and processing, using the multi-objective scorer, the corresponding additional sets of the plurality of attribute scores, for each of the plurality of additional candidate segments, to select the given additional segment, from among the plurality of additional candidate segments, for inclusion in the given stream of NL based output that is responsive to the NL based input and that is for the given dialog context of the ongoing dialog.

In some versions of those implementations, the method can further include: determining that the given stream of NL based output that is responsive to the NL based input is to be rendered at the client device in a streaming manner. Further, causing the given segment, of the given stream of NL based output, to be rendered at the client device, and that is for the given context of the ongoing dialog, can be in response to the given segment being selected for inclusion in the given stream of NL based output. Moreover, causing the given additional segment, of the given stream of NL based output and that follows the given segment, to be rendered at the client device, and that is for the given context of the ongoing dialog, can be in response to the given additional segment being selected for inclusion in the given stream of NL based output.

In additional or alternative versions of those implementations, the method can further include: determining that the given stream of NL based output that is responsive to the NL based input can be to be rendered at the client device in a non-streaming manner. Further, causing the given segment, of the given stream of NL based output, to be rendered at the client device, and that is for the given context of the ongoing dialog, can be in response to the given segment being selected for inclusion in the given stream of NL based output and in response to the given additional segment, of the given stream of NL based output and that follows the given segment, being selected for inclusion in the given stream of NL based output.

In some implementations, the method can further include generating, based on processing the NL based input using the LLM, a given alternative stream of NL based output that is also responsive to the NL based input and that is for a given alternative dialog context of the ongoing dialog. The given alternative stream of NL based output can include a plurality of alternative segments. Further, generating a given alternative segment, of the plurality of alternative segments, of the given alternative stream of NL based output that is also responsive to the NL based input and based on processing the NL based input using the LLM can include: determining, based on the stream of LLM output, a plurality of alternative candidate segments for the given alternative segment; processing, using the plurality of attribute classifiers, each of the plurality of alternative candidate segments, for the given alternative segment, to generate a corresponding alternative set of a plurality of attribute scores for each of the plurality of alternative candidate segments; and processing, using the multi-objective scorer, the corresponding alternative sets of the plurality of attribute scores, for each of the plurality of alternative candidate segments, to select the given alternative segment, from among the plurality of alternative candidate segments, for inclusion in the given alternative stream of NL based output that is also responsive to the NL based input and that is for the given alternative dialog context of the ongoing dialog. Moreover, the method can further include, in response to determining that the given alternative stream of NL based output that is also responsive to the NL based input is to be rendered at the client device: causing the given alternative stream of NL based output to be rendered at the client device and that is for the given alternative context of the ongoing dialog.

In some versions of those implementations, the given alternative dialog context for the ongoing dialog can include at least the given alternative segment. Further, generating a given additional alternative segment, of the plurality of alternative segments and that follows the given alternative segment, of the given alternative stream of NL based output that is also responsive to the NL based input and based on processing the NL based input using the LLM can include: determining, based on the stream of LLM output, a plurality of additional alternative candidate segments for the given additional alternative segment; processing, using the plurality of attribute classifiers, each of the plurality of additional alternative candidate segments, for the given additional alternative segment, to generate a corresponding additional alternative set of a plurality of attribute scores for each of the plurality of additional alternative candidate segments; and processing, using the multi-objective scorer, the corresponding additional alternative sets of the plurality of attribute scores, for each of the plurality of additional alternative candidate segments, to select the given additional alternative segment, from among the plurality of additional alternative candidate segments, for inclusion in the given alternative stream of NL based output that is also responsive to the NL based input and that is for the given alternative dialog context of the ongoing dialog.

In some further versions of those implementations, both the given stream of NL based that is for the given context of the ongoing dialog and the given alternative stream of NL based output that is for the given alternative context of the ongoing dialog can be rendered at the client device.

In some yet further versions of those implementations, the given stream of NL based that is for the given context of the ongoing dialog can be rendered at the client device more prominently than the given alternative stream of NL based output that is for the given alternative context of the ongoing dialog.

In some implementations, the plurality of attribute classifiers can include at least a filtering classifier and one or more ranking classifiers. Further, processing a given candidate segment, of the plurality of candidate segments, to generate the corresponding set of the plurality of attribute scores for the given candidate segment and using the plurality of attribute classifiers can include: processing, using the filtering classifier, the given candidate segment to determine a corresponding filtering score for the given candidate segment; processing, using the one or more ranking classifiers, the given candidate segment to determine one or more corresponding ranking scores for the given candidate segment; and generating, based on the corresponding filtering score for the given candidate segment and the one or more corresponding ranking scores for the given candidate segment, the corresponding set of the plurality of attribute scores for the given candidate segment.

In some versions of those implementations, processing the corresponding sets of the plurality of attribute scores, for each of the plurality of candidate segments, to select the given segment, from among the plurality of candidate segments, for inclusion in the given stream of NL based output that is responsive to the NL based input and that is for the given dialog context of the ongoing dialog and using the multi-objective scorer can include: filtering, based on the corresponding filtering scores for each of the plurality of candidate segments, to generate a subset of the plurality of candidate segments; ranking, based on the one or more corresponding ranking scores for each of the plurality of candidate segments in the subset, each of the plurality of candidate segments that are included in the subset; and selecting, based on the ranking, the given segment from among the plurality of candidate segments.

In some further versions of those implementations, the multi-objective scorer can include a plurality of tunable parameters that are dynamically adjustable throughout the ongoing dialog to dynamically adjust the filtering and the ranking.

In some yet further versions of those implementations, the filtering classifier can be an assurance filtering classifier that is trained to generate an assurance score as the corresponding filtering scores for each of the plurality of candidate segments.

In some even yet further versions of those implementations, the one or more ranking classifiers can include one or more of: a quality ranking classifier that is trained to generate a quality score as the one or more corresponding ranking scores for each of the plurality of candidate segments, or an accuracy ranking classifier that is trained to generate an accuracy score as the one or more ranking scores for each of the plurality of candidate segments.

In some implementations, the stream of LLM output can include a probability distribution over a sequence of tokens, and wherein each of the plurality of candidate segments are selected from the sequence of tokens and based on the probability distribution.

In some versions of those implementations, each of the plurality of candidate segments can include a fixed number of tokens.

In some implementations, the multi-objective scorer can be trained prior to the ongoing dialog being initiated and based on a plurality of training instances.

In some implementations, a method implemented by one or more processors is provided, and includes: obtaining a plurality of training instances for training a multi-objective scorer, each of the plurality of training instances including a corresponding dialog context and a corresponding natural language (NL) based output that is associated with the corresponding dialog context; and training, based on the plurality of training instances, the multi-objective scorer. Training the multi-objective scorer based on a given training instance, from among the plurality of training instances, can include: processing, using a plurality of attribute classifiers, the corresponding dialog context and the corresponding NL based output, in its entirety, that is associated with the corresponding dialog context to generate a given set of a plurality of attribute scores for the given training instance; processing, using the multi-objective scorer, the corresponding dialog context and the corresponding NL based output, on a token-by-token basis, that is associated with the corresponding dialog context to generate a given corresponding set of a plurality of predicted attribute scores for each token of the corresponding NL based output; and determining, based on (1) the given set of the plurality of attribute scores for the given training instance and (2) the given corresponding set of the plurality of predicted attribute scores for each token of the corresponding NL based output, a given multi-objective scorer loss; and causing, based on the given multi-objective scorer loss, the multi-objective scorer to be updated. Further, the method includes causing the multi-objective scorer to be subsequently utilized in blockwise controlled decoding of subsequent NL based output generated based on large language model (LLM) output.

These and other implementations of technology disclosed herein can optionally include one or more of the following features.

In some implementations, the plurality of attribute classifiers can include at least a filtering classifier and one or more ranking classifiers. Further, processing the NL based output that is associated with the corresponding dialog context to generate the given set of the plurality of attribute scores for the given training instance and using the plurality of attribute classifiers can include: processing, using the filtering classifier, the corresponding dialog context and the corresponding NL based output that is associated with the corresponding dialog context to determine a corresponding filtering score for the NL based output that is associated with the corresponding dialog context; processing, using the one or more ranking classifiers, the corresponding dialog context and the corresponding NL based output that is associated with the corresponding dialog context to determine one or more corresponding ranking scores for the NL based output that is associated with the corresponding dialog context; and generating, based on the corresponding filtering score for the NL based output that is associated with the corresponding dialog context and the one or more corresponding ranking scores for the NL based output that is associated with the corresponding dialog context, the given set of the plurality of attribute scores for the given training instance.

In some implementations, processing the corresponding dialog context and the corresponding NL based output, on the token-by-token basis, that is associated with the corresponding dialog context to generate the given corresponding set of the plurality of predicted attribute scores for each token of the corresponding NL based output and using the multi-objective scorer can include: processing, using the given multi-objective scorer, the corresponding dialog context and a first token of the corresponding NL based output, from among a plurality of tokens of the corresponding NL based output, that is associated with the corresponding dialog context to predict a plurality of first token attribute scores for the first token of the corresponding NL based output of the given training instance.

In some versions of those implementations, processing the corresponding dialog context and the corresponding NL based output, on the token-by-token basis, that is associated with the corresponding dialog context to generate the given corresponding set of the plurality of predicted attribute scores for each token of the corresponding NL based output and using the multi-objective scorer further can include: processing, using the given multi-objective scorer, the corresponding dialog context and a second token of the corresponding NL based output, from among the plurality of tokens of the corresponding NL based output and that follows the first token of the corresponding NL based output, that is associated with the corresponding dialog context to predict a plurality of second token attribute scores for the second token of the corresponding NL based output of the given training instance.

In some further versions of those implementations, determining the given multi-objective scorer loss based on (1) the given set of the plurality of attribute scores for the given training instance and (2) the given corresponding set of the plurality of predicted attribute scores for each token of the corresponding NL based output can include: determining, based on comparing the given set of the plurality of attribute scores generated using the plurality of attribute classifiers and the plurality of first token attribute scores for the first token of the corresponding NL based output generated using the multi-objective scorer, a first token loss; determining, based on comparing the given set of the plurality of attribute scores generated using the plurality of attribute classifiers and the plurality of second token attribute scores for the second token of the corresponding NL based output generated using the multi-objective scorer, a second token loss; and determining, based on at least the first token loss and the second token loss, the given multi-objective scorer loss.

In addition, some implementations include one or more processors (e.g., central processing unit(s) (CPU(s)), graphics processing unit(s) (GPU(s), and/or tensor processing unit(s) (TPU(s)) of one or more computing devices, where the one or more processors are operable to execute instructions stored in associated memory, and where the instructions are configured to cause performance of any of the aforementioned methods. Some implementations also include one or more computer readable storage media (e.g., transitory and/or non-transitory) storing computer instructions executable by one or more processors to perform any of the aforementioned methods. Some implementations also include a computer program product including instructions executable by one or more processors to perform any of the aforementioned methods.

What is claimed is:

1. A method implemented by one or more processors, the method comprising:

receiving natural language (NL) based input associated with a client device and as part of an ongoing dialog;

generating, based on processing the NL based input using a large language model (LLM), a given stream of NL based output that is responsive to the NL based input on a segment-by-segment basis and that is for a given dialog context of the ongoing dialog, wherein the given stream of NL based output includes a plurality of segments, and wherein generating a given segment, of the plurality of segments, of the given stream of NL based output that is responsive to the NL based input and based on processing the NL based input using the LLM comprises:

processing, using the LLM, the NL based input to decode a stream of LLM output;

determining, based on the stream of LLM output, a plurality of candidate segments for the given segment as the stream of LLM output is being decoded;

processing, using a plurality of attribute classifiers, each of the plurality of candidate segments, for the given segment, to generate a corresponding set of a plurality of attribute scores for each of the plurality of candidate segments;

processing, using a multi-objective scorer, the corresponding sets of the plurality of attribute scores, for each of the plurality of candidate segments, to select the given segment, from among the plurality of candidate segments, for inclusion in the given stream of NL based output that is responsive to the NL based input and that is for the given dialog context of the ongoing dialog; and incorporating the given segment into the given dialog context of the ongoing dialog for utilization in determining, based on the stream of LLM output, a plurality of additional candidate segments for a given additional segment, that follows the given segment in the given stream of NL based output, as the stream of LLM output is being decoded; and causing the given stream of NL based output to be rendered at the client device on the segment-by-segment basis as each of the plurality of segments are selected for inclusion in the given stream of NL based output that is responsive to the NL based input and that is for the given dialog context of the ongoing dialog.

2. The method of claim 1, wherein generating the given additional segment, that follows the given segment in the given stream of NL based output comprises:

determining, based on the stream of LLM output, the plurality of additional candidate segments for the given additional segment as the stream of LLM output is being decoded;

processing, using the plurality of attribute classifiers, each of the plurality of additional candidate segments, for the given additional segment, to generate a corresponding additional set of a plurality of attribute scores for each of the plurality of additional candidate segments; and processing, using the multi-objective scorer, the corresponding additional sets of the plurality of attribute scores, for each of the plurality of additional candidate segments, to select the given additional segment, from among the plurality of additional candidate segments, for inclusion in the given stream of NL based output that is responsive to the NL based input and that is for the given dialog context of the ongoing dialog.

3. The method of claim 1, further comprising:

generating, based on processing the NL based input using the LLM, a given alternative stream of NL based output that is also responsive to the NL based input on the segment-by-segment basis and that is for a given alternative dialog context of the ongoing dialog, wherein the given alternative stream of NL based output includes a plurality of alternative segments, and wherein generating a given alternative segment, of the plurality of alternative segments, of the given alternative stream of NL based output that is also responsive to the NL based input and based on processing the NL based input using the LLM comprises:

determining, based on the stream of LLM output, a plurality of alternative candidate segments for the given alternative segment as the stream of LLM output is being decoded;

processing, using the plurality of attribute classifiers, each of the plurality of alternative candidate segments, for the given alternative segment, to generate a corresponding alternative set of a plurality of attribute scores for each of the plurality of alternative candidate segments;

processing, using the multi-objective scorer, the corresponding alternative sets of the plurality of attribute scores, for each of the plurality of alternative candidate segments, to select the given alternative segment, from among the plurality of alternative candidate segments, for inclusion in the given alternative stream of NL based output that is also responsive to the NL based input and that is for the given alternative dialog context of the ongoing dialog; and incorporating the given alternative segment into the given alternative dialog context of the ongoing dialog for utilization in determining, based on the stream of LLM output, a plurality of additional alternative candidate segments for a given additional alternative segment, that follows the given alternative segment in the given alternative stream of NL based output, as the stream of LLM output is being decoded; and causing the given alternative stream of NL based output to be rendered at the client device on the segment-by-segment basis as each of the plurality of alternative segments are selected for inclusion in the given alternative stream of NL based output that is responsive to the NL based input and that is for the given alternative dialog context of the ongoing dialog.

4. The method of claim 3, wherein generating the given additional alternative segment, that follows the given alternative segment in the given alternative stream of NL based output comprises:

determining, based on the stream of LLM output, the plurality of additional alternative candidate segments for the given additional alternative segment as the stream of LLM output is being decoded;

processing, using the plurality of attribute classifiers, each of the plurality of additional alternative candidate segments, for the given additional alternative segment, to generate a corresponding additional alternative set of a plurality of attribute scores for each of the plurality of additional alternative candidate segments; and processing, using the multi-objective scorer, the corresponding additional alternative sets of the plurality of attribute scores, for each of the plurality of additional alternative candidate segments, to select the given additional alternative segment, from among the plurality of additional alternative candidate segments, for inclusion in the given alternative stream of NL based output that is also responsive to the NL based input and that is for the given alternative dialog context of the ongoing dialog.

5. The method of claim 4, wherein both the given stream of NL based output that is for the given dialog context of the ongoing dialog and the given alternative stream of NL based output that is for the given alternative dialog context of the ongoing dialog are rendered at the client device.

6. The method of claim 5, wherein the given stream of NL based output that is for the given dialog context of the ongoing dialog is rendered at the client device more prominently than the given alternative stream of NL based output that is for the given alternative dialog context of the ongoing dialog.

7. The method of claim 1, wherein the plurality of attribute classifiers include at least a filtering classifier and one or more ranking classifiers, and wherein processing a given candidate segment, of the plurality of candidate segments, to generate the corresponding set of the plurality of attribute scores for the given candidate segment and using the plurality of attribute classifiers comprises:

processing, using the filtering classifier, the given candidate segment to determine a corresponding filtering score for the given candidate segment;

processing, using the one or more ranking classifiers, the given candidate segment to determine one or more corresponding ranking scores for the given candidate segment; and generating, based on the corresponding filtering score for the given candidate segment and the one or more corresponding ranking scores for the given candidate segment, the corresponding set of the plurality of attribute scores for the given candidate segment.

8. The method of claim 7, wherein processing the corresponding sets of the plurality of attribute scores, for each of the plurality of candidate segments, to select the given segment, from among the plurality of candidate segments, for inclusion in the given stream of NL based output that is responsive to the NL based input and that is for the given dialog context of the ongoing dialog and using the multi-objective scorer comprises:

filtering, based on the corresponding filtering scores for each of the plurality of candidate segments, to generate a subset of the plurality of candidate segments;

ranking, based on the one or more corresponding ranking scores for each of the plurality of candidate segments in the subset, each of the plurality of candidate segments that are included in the subset; and selecting, based on the ranking, the given segment from among the plurality of candidate segments.

9. The method of claim 8, wherein the multi-objective scorer includes a plurality of tunable parameters that are dynamically adjustable throughout the ongoing dialog to dynamically adjust the filtering and the ranking.

10. The method of claim 7, wherein the filtering classifier is an assurance filtering classifier that is trained to generate an assurance score as the corresponding filtering scores for each of the plurality of candidate segments.

11. The method of claim 10, wherein the one or more ranking classifiers include one or more of: a quality ranking classifier that is trained to generate a quality score as the one or more corresponding ranking scores for each of the plurality of candidate segments, or an accuracy ranking classifier that is trained to generate an accuracy score as the one or more ranking scores for each of the plurality of candidate segments.

12. The method of claim 1, wherein the stream of LLM output comprises a probability distribution over a sequence of tokens, and wherein each of the plurality of candidate segments are selected from the sequence of tokens and based on the probability distribution.

13. The method of claim 12, wherein each of the plurality of candidate segments includes a fixed number of tokens.

14. The method of claim 1, wherein the multi-objective scorer is trained prior to the ongoing dialog being initiated and based on a plurality of training instances.

15. A system comprising:

one or more hardware processors; and memory storing instructions that, when executed by the one or more hardware processors, cause the one or more hardware processors to:

receive natural language (NL) based input associated with a client device and as part of an ongoing dialog;

generate, based on processing the NL based input using a large language model (LLM), a given stream of NL based output that is responsive to the NL based input on a segment-by-segment basis and that is for a given dialog context of the ongoing dialog, wherein the given stream of NL based output includes a plurality of segments, and wherein the instructions to generate a given segment, of the plurality of segments, of the given stream of NL based output that is responsive to the NL based input and based on processing the NL based input using the LLM comprise instructions to:

process, using the LLM, the NL based input to decode a stream of LLM output;

determine, based on the stream of LLM output, a plurality of candidate segments for the given segment as the stream of LLM output is being decoded;

process, using a plurality of attribute classifiers, each of the plurality of candidate segments, for the given segment, to generate a corresponding set of a plurality of attribute scores for each of the plurality of candidate segments;

process, using a multi-objective scorer, the corresponding sets of the plurality of attribute scores, for each of the plurality of candidate segments, to select the given segment, from among the plurality of candidate segments, for inclusion in the given stream of NL based output that is responsive to the NL based input and that is for the given dialog context of the ongoing dialog; and incorporate the given segment into the given dialog context of the ongoing dialog for utilization in determining, based on the stream of LLM output, a plurality of additional candidate segments for a given additional segment, that follows the given segment in the given stream of NL based output, as the stream of LLM output is being decoded; and cause the given stream of NL based output to be rendered at the client device on the segment-by-segment basis as each of the plurality of segments are selected for inclusion in the given stream of NL based output that is responsive to the NL based input and that is for the given dialog context of the ongoing dialog.

16. The system of claim 15, wherein the instructions to generate the given additional segment, that follows the given segment in the given stream of NL based output comprise instructions to:

determine, based on the stream of LLM output, the plurality of additional candidate segments for the given additional segment as the stream of LLM output is being decoded;

process, using the plurality of attribute classifiers, each of the plurality of additional candidate segments, for the given additional segment, to generate a corresponding additional set of a plurality of attribute scores for each of the plurality of additional candidate segments; and process, using the multi-objective scorer, the corresponding additional sets of the plurality of attribute scores, for each of the plurality of additional candidate segments, to select the given additional segment, from among the plurality of additional candidate segments, for inclusion in the given stream of NL based output that is responsive to the NL based input and that is for the given dialog context of the ongoing dialog.

17. The system of claim 15, wherein the instructions further cause the one or more hardware processors to:

generate, based on processing the NL based input using the LLM, a given alternative stream of NL based output that is also responsive to the NL based input on the segment-by-segment basis and that is for a given alternative dialog context of the ongoing dialog, wherein the given alternative stream of NL based output includes a plurality of alternative segments, and wherein the instructions to generate a given alternative segment, of the plurality of alternative segments, of the given alternative stream of NL based output that is also responsive to the NL based input and based on processing the NL based input using the LLM comprise instructions to:

determine, based on the stream of LLM output, a plurality of alternative candidate segments for the given alternative segment;

process, using the plurality of attribute classifiers, each of the plurality of alternative candidate segments, for the given alternative segment, to generate a corresponding alternative set of a plurality of attribute scores for each of the plurality of alternative candidate segments;

process, using the multi-objective scorer, the corresponding alternative sets of the plurality of attribute scores, for each of the plurality of alternative candidate segments, to select the given alternative segment, from among the plurality of alternative candidate segments, for inclusion in the given alternative stream of NL based output that is also responsive to the NL based input and that is for the given alternative dialog context of the ongoing dialog; and incorporate the given alternative segment into the given alternative dialog context of the ongoing dialog for utilization in determining, based on the stream of LLM output, a plurality of additional alternative candidate segments for a given additional alternative segment, that follows the given alternative segment in the given alternative stream of NL based output, as the stream of LLM output is being decoded; and cause the given alternative stream of NL based output to be rendered at the client device on the segment-by-segment basis as each of the plurality of alternative segments are selected for inclusion in the given alternative stream of NL based output that is responsive to the NL based input and that is for the given alternative dialog context of the ongoing dialog.

18. A non-transitory computer-readable storage medium storing instructions that, when executed, cause one or more processors to perform operations to:

receive natural language (NL) based input associated with a client device and as part of an ongoing dialog;

generate, based on processing the NL based input using a large language model (LLM), a given stream of NL based output that is responsive to the NL based input on a segment-by-segment basis and that is for a given dialog context of the ongoing dialog, wherein the given stream of NL based output includes a plurality of segments, and wherein the operations to generate a given segment, of the plurality of segments, of the given stream of NL based output that is responsive to the NL based input and based on processing the NL based input using the LLM comprise operations to:

process, using the LLM, the NL based input to decode a stream of LLM output;

determine, based on the stream of LLM output, a plurality of candidate segments for the given segment as the stream of LLM output is being decoded;

process, using a plurality of attribute classifiers, each of the plurality of candidate segments, for the given segment, to generate a corresponding set of a plurality of attribute scores for each of the plurality of candidate segments;

process, using a multi-objective scorer, the corresponding sets of the plurality of attribute scores, for each of the plurality of candidate segments, to select the given segment, from among the plurality of candidate segments, for inclusion in the given stream of NL based output that is responsive to the NL based input and that is for the given dialog context of the ongoing dialog; and incorporate the given segment into the given dialog context of the ongoing dialog for utilization in determining, based on the stream of LLM output, a plurality of additional candidate segments for a given additional segment, that follows the given segment in the given stream of NL based output, as the stream of LLM output is being decoded; and cause the given stream of NL based output to be rendered at the client device on the segment-by-segment basis as each of the plurality of segments are selected for inclusion in the given stream of NL based output that is responsive to the NL based input and that is for the given dialog context of the ongoing dialog.

* * * * *